US012677326B2

(12) United States Patent
Akl et al.

(10) Patent No.: US 12,677,326 B2
(45) Date of Patent: Jul. 7, 2026

(54) TIMING ADVANCE ACQUISITION IN LAYER 1/LAYER 2-TRIGGERED MOBILITY

(71) Applicant: QUALCOMM Incorporated, San Diego, CA (US)

(72) Inventors: Naeem Akl, Bridgewater, NJ (US); Tao Luo, San Diego, CA (US); Jelena Damnjanovic, Del Mar, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 322 days.

(21) Appl. No.: 18/617,258

(22) Filed: Mar. 26, 2024

(65) Prior Publication Data

US 2024/0340964 A1 Oct. 10, 2024

Related U.S. Application Data

(60) Provisional application No. 63/494,432, filed on Apr. 5, 2023.

(51) Int. Cl.

| | |
|---|---|
| ***H04W 74/0833*** | (2024.01) |
| ***H04W 56/00*** | (2009.01) |
| ***H04W 74/08*** | (2009.01) |

(52) U.S. Cl.

CPC ... *H04W 74/0833* (2013.01); *H04W 56/0045* (2013.01); *H04W 74/0866* (2013.01)

(58) Field of Classification Search

CPC ......... H04W 74/0833; H04W 56/0045; H04W 74/0866

See application file for complete search history.

(56) References Cited

U.S. PATENT DOCUMENTS

2024/0284373 A1* 8/2024 Goyal ................. H04W 56/001
2024/0373311 A1* 11/2024 Bala .................. H04W 36/0058

FOREIGN PATENT DOCUMENTS

JP 4944254 B2 5/2012
WO WO-2024073952 A1 * 4/2024 ........ H04W 36/0055

(Continued)

OTHER PUBLICATIONS

Huawei, et al., "RACH Preamble Design for NR", 3GPP TSG RAN WG1 NR Ad Hoc Meeting, R1-1700034, 3rd Generation Partnership Project, Mobile Competence Centre, 650, Route Des Lucioles, F-06921 Sophia-Antipolis Cedex, France, vol. RAN WG1, No. Spokane, USA, Jan. 16, 2017-Jan. 20, 2017, Jan. 16, 2017, 12 Pages XP051207576, p. 2.

(Continued)

*Primary Examiner* — Deepa Belur
(74) *Attorney, Agent, or Firm* — Holland & Hart LLP

(57) ABSTRACT

Methods, systems, and devices for wireless communications are described. A user equipment (UE) may transmit a random access channel (RACH) message to a first distributed unit (DU) via a cell supported by the first DU to support acquisition of timing advance (TA) information prior to switching to the cell. A second DU serving the UE may identify and indicate the TA information to the UE based on the UE transmitting the RACH message indicating a RACH preamble allocated to the second DU by a central unit (CU). The RACH preamble may be included in a set of preambles indicated to the CU by the first DU for TA information acquisition. Alternatively, the UE may be identified by the first DU based on a UE-specific RACH preamble, a RACH preamble, RACH occasion (RO) pair, or a request by the second DU to order the UE to transmit the RACH message.

20 Claims, 18 Drawing Sheets

(56) References Cited

FOREIGN PATENT DOCUMENTS

| | | | | |
|---|---|---|---|---|
| WO | WO-2024097975 A1 | | 5/2024 | |
| WO | WO-2025075546 A1 | * | 4/2025 | ........ H04W 56/0045 |

OTHER PUBLICATIONS

International Search Report and Written Opinion—PCT/US2024/021614—ISA/EPO—Jul. 24, 2024.

Merias P (Moderator (CATT))., et al., "Moderator Summary on Timing Advance Management for LTM: Round 4", 3GPP TSG RAN WG1 #112, R1-2302165, 3rd Generation Partnership Project, Mobile Competence Centre, 650, Route Des Lucioles, F-06921 Sophia-Antipolis Cedex, France, vol. 3GPP RAN 1, No. Athens, GR, Feb. 27, 2023-Mar. 3, 2023, Mar. 3, 2023, 24 Pages, XP052251856, pp. 1-6.

* cited by examiner

TIMING ADVANCE ACQUISITION IN LAYER 1/LAYER 2-TRIGGERED MOBILITY

CROSS REFERENCE

The present Application for Patent claims the benefit of U.S. Provisional Patent Application No. 63/494,432 by AKL et al., entitled "TIMING ADVANCE ACQUISITION IN LAYER 1/LAYER 2-TRIGGERED MOBILITY," filed Apr. 5, 2023, assigned to the assignee hereof, and expressly incorporated by reference herein.

FIELD OF TECHNOLOGY

The following relates to wireless communications, including timing advance (TA) acquisition in layer 1 (L1)/layer 2 (L2)-triggered mobility (LTM).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Layer 1 (L1)/layer 2 (L2)-triggered mobility (LTM) may include early acquisition of timing advance (TA) information before a UE switches to a candidate target cell to support switching to the candidate target cell without performing random access channel (RACH) procedure. However, identification at the candidate target cell as to which UE TA information corresponds may be unsupported. Thus, acquisition of the TA information at (e.g., forwarding of the TA information to) the UE before switching may be unsupported.

SUMMARY

The described techniques relate to improved methods, systems, devices, and apparatuses that support timing advance (TA) acquisition in layer 1 (L1)/layer 2 (L2)-triggered mobility (LTM). More specifically, the described techniques support TA information associated with (e.g., measured at) a candidate target cell to be obtained by a user equipment (UE) before switching to the candidate target cell, which may enable the UE to switch to the candidate target cell without performing a random access channel (RACH) procedure. For instance, the UE to which TA information corresponds may be identified at a serving cell of the UE (e.g., by a first distributed unit (DU) supporting the serving cell of the UE), and the first DU may indicate the TA information to the UE before or as part of an indication for the UE to switch to the candidate target cell. For example, coordination between the first DU, a second DU associated with the candidate target cell, and a central unit (CU) that manages the first and second DUs may be performed, including the allocation of one or more RACH preambles to the first DU to be used by UEs served by the first DU in obtaining TA information associated with the candidate target cell. As such, based on the allocation of the RACH preambles, TA information measured by the second DU may be forwarded (e.g., transmitted routed) to the first DU. The first DU may determine that the TA information is associated with the UE based on having ordered the UE to transmit a RACH message indicating one of the allocated RACH preambles and may indicate the TA information to the UE before or as part of the indication for the UE to switch to the candidate target cell.

Alternatively, the described techniques support identification of the UE at the candidate target cell. For example, RACH preambles or RACH preamble, RACH occasion (RO) pairs may be UE-specific (e.g., uniquely allocated to a specific UE) such that the second DU may identify the UE to which the TA information corresponds. As such, the second DU may indicate the TA information to the UE or may forward the TA information to the first DU (e.g., via the CU) to be indicated to the UE by the first DU. Alternatively, prior to transmission of a RACH message by the UE, the first DU may request the second DU for permission to order the UE to transmit the RACH message (e.g., indicating a particular RACH preamble, via a particular RO) such that the second DU may identify the UE to which the TA information corresponds.

A method for wireless communications at a first DU associated with a first cell is described. The method may include transmitting, to a CU associated with the first DU, a first indication of a set of RACH preambles for TA information acquisition in association with a triggered cell switch to the first cell, receiving, from a user equipment (UE) associated with a second cell, a RACH message indicating a RACH preamble of the set of RACH preambles, and transmitting, to the CU, a second indication of TA information associated with the RACH message.

An apparatus for wireless communications at a first DU associated with a first cell is described. The apparatus may include a processor, memory coupled with the processor, and instructions stored in the memory. The instructions may be executable by the processor to cause the apparatus to transmit, to a CU associated with the first DU, a first indication of a set of RACH preambles for TA information acquisition in association with a triggered cell switch to the first cell, receive, from a UE associated with a second cell, a RACH message indicating a RACH preamble of the set of RACH preambles, and transmit, to the CU, a second indication of TA information associated with the RACH message.

Another apparatus for wireless communications at a first DU associated with a first cell is described. The apparatus may include means for transmitting, to a CU associated with the first DU, a first indication of a set of RACH preambles for TA information acquisition in association with a triggered cell switch to the first cell, means for receiving, from a UE associated with a second cell, a RACH message indicating a RACH preamble of the set of RACH preambles, and means for transmitting, to the CU, a second indication of TA information associated with the RACH message.

A non-transitory computer-readable medium storing code for wireless communications at a first DU associated with a first cell is described. The code may include instructions executable by a processor to transmit, to a CU associated with the first DU, a first indication of a set of RACH preambles for TA information acquisition in association with a triggered cell switch to the first cell, receive, from a UE associated with a second cell, a RACH message indicating a RACH preamble of the set of RACH preambles, and transmit, to the CU, a second indication of TA information associated with the RACH message.

Some examples of the method, apparatuses, and non-transitory computer-readable medium described herein may further include operations, features, means, or instructions for receiving, from the CU, a request for the first DU to allocate the set of RACH preambles for the TA information acquisition, where the request includes an identifier (ID) of the second DU, and where the first indication may be transmitted in response to the request.

In some examples of the method, apparatuses, and non-transitory computer-readable medium described herein, the second indication indicates an ID of the first cell, an ID associated with the RACH preamble, or a combination thereof.

In some examples of the method, apparatuses, and non-transitory computer-readable medium described herein, the second indication indicates the RACH preamble, an RO via which the RACH message may be received, a timestamp of reception of the RACH message, an indication of the second DU, or a combination thereof.

Some examples of the method, apparatuses, and non-transitory computer-readable medium described herein may further include operations, features, means, or instructions for receiving, from the CU, a third indication of respective allocations of one or more RACH preambles of the set of RACH preambles to respective DUs of a set of DUs associated with the CU, where the second indication indicates a second DU of the set of DUs and associated with the second cell based on the RACH preamble being included in a respective allocation of one or more RACH preambles to the second DU.

Some examples of the method, apparatuses, and non-transitory computer-readable medium described herein may further include operations, features, means, or instructions for communicating with the UE based on a cell switch of the UE to the first cell in accordance with the TA information.

Some examples of the method, apparatuses, and non-transitory computer-readable medium described herein may further include operations, features, means, or instructions for allocating a second set of RACH preambles for the TA information acquisition, the second set of RACH preambles associated with a cell switch from a third cell associated with the DU to the first cell, transmitting, to a second UE associated with the third cell, a third indication to transmit, to the first cell, a second RACH message indicating a second RACH preamble of the second set of RACH preambles, and receiving, from the second UE and based on the third indication, the second RACH message indicating the second RACH preamble, where the second UE may be identified by the DU based on the second RACH preamble.

In some examples of the method, apparatuses, and non-transitory computer-readable medium described herein, the second set of RACH preambles may be excluded from the set of RACH preambles based on being associated with the cell switch from the third cell.

In some examples of the method, apparatuses, and non-transitory computer-readable medium described herein, transmitting the second indication may include operations, features, means, or instructions for transmitting the second indication via non-UE associated signaling.

In some examples of the method, apparatuses, and non-transitory computer-readable medium described herein, the triggered cell switch to the first cell may be an L1 triggered cell switch or L2 triggered cell switch.

A method for wireless communications at a CU is described. The method may include receiving, from a first DU associated with the CU, a first indication of a set of RACH preambles for TA information acquisition in association with a triggered cell switch to a first cell associated with the first DU, transmitting, to a second DU associated with the CU, a second indication of one or more RACH preambles of the set of RACH preambles allocated to the second DU for the TA information acquisition, receiving, from the first DU, a third indication of TA information associated with a RACH message indicating a RACH preamble of the one or more RACH preambles, and transmitting, to the second DU, a fourth indication of the TA information.

An apparatus for wireless communications at a CU is described. The apparatus may include a processor, memory coupled with the processor, and instructions stored in the memory. The instructions may be executable by the processor to cause the apparatus to receive, from a first DU associated with the CU, a first indication of a set of RACH preambles for TA information acquisition in association with a triggered cell switch to a first cell associated with the first DU, transmit, to a second DU associated with the CU, a second indication of one or more RACH preambles of the set of RACH preambles allocated to the second DU for the TA information acquisition, receive, from the first DU, a third indication of TA information associated with a RACH message indicating a RACH preamble of the one or more RACH preambles, and transmit, to the second DU, a fourth indication of the TA information.

Another apparatus for wireless communications at a CU is described. The apparatus may include means for receiving, from a first DU associated with the CU, a first indication of a set of RACH preambles for TA information acquisition in association with a triggered cell switch to a first cell associated with the first DU, means for transmitting, to a second DU associated with the CU, a second indication of one or more RACH preambles of the set of RACH preambles allocated to the second DU for the TA information acquisition, means for receiving, from the first DU, a third indication of TA information associated with a RACH message indicating a RACH preamble of the one or more RACH preambles, and means for transmitting, to the second DU, a fourth indication of the TA information.

A non-transitory computer-readable medium storing code for wireless communications at a CU is described. The code may include instructions executable by a processor to receive, from a first DU associated with the CU, a first indication of a set of RACH preambles for TA information acquisition in association with a triggered cell switch to a first cell associated with the first DU, transmit, to a second DU associated with the CU, a second indication of one or more RACH preambles of the set of RACH preambles allocated to the second DU for the TA information acquisition, receive, from the first DU, a third indication of TA information associated with a RACH message indicating a RACH preamble of the one or more RACH preambles, and transmit, to the second DU, a fourth indication of the TA information.

Some examples of the method, apparatuses, and non-transitory computer-readable medium described herein may further include operations, features, means, or instructions for transmitting, to the first DU, a request for the first DU to allocate the set of RACH preambles for the TA information acquisition, where the request includes an ID of the second DU, and where the first indication may be received in response to the request.

In some examples of the method, apparatuses, and non-transitory computer-readable medium described herein, transmitting the fourth indication may include operations, features, means, or instructions for transmitting the fourth indication to the second DU based on the third indication indicating the RACH preamble and the RACH preamble being included in the one or more RACH preambles allocated to the second DU.

Some examples of the method, apparatuses, and non-transitory computer-readable medium described herein may further include operations, features, means, or instructions for transmitting, to the first DU, a fifth indication of the allocation of the one or more RACH preambles to the second DU, where the third indication indicates the second DU based on the fifth indication and the RACH preamble being included in the one or more RACH preambles allocated to the second DU.

In some examples of the method, apparatuses, and non-transitory computer-readable medium described herein, transmitting the fourth indication may include operations, features, means, or instructions for transmitting the fourth indication to the second DU based on the third indication indicating the second DU.

In some examples of the method, apparatuses, and non-transitory computer-readable medium described herein, the third indication indicates an ID of the first cell, an ID associated with the RACH preamble, an RO via which the RACH message may be received at the first DU, a timestamp of a reception of the RACH message at the first DU, or a combination thereof and the fourth indication indicates the ID of the first cell, the ID associated with the RACH preamble, the RO, the timestamp of the reception of the RACH message at the first DU, or a combination thereof.

In some examples of the method, apparatuses, and non-transitory computer-readable medium described herein, transmitting the fourth indication may include operations, features, means, or instructions for transmitting the fourth indication to the second DU based on the third indication indicating an ID associated with the RACH preamble and an RO via which the RACH message may be received at the first DU, where a combination of the ID and the RO indicates the second DU as having ordered a transmission of the RACH message.

In some examples of the method, apparatuses, and non-transitory computer-readable medium described herein, the second indication indicates one or more Ros including the RO that may be allocated to the second DU and the combination of the ID and the RO indicates the second DU based on each of the RACH preamble and the RO being allocated to the second DU.

In some examples of the method, apparatuses, and non-transitory computer-readable medium described herein, transmitting the second indication may include operations, features, means, or instructions for transmitting the second indication to a set of DUs including the second DU, the second indication allocating the one or more RACH preambles to each DU of the set of DUs, where transmitting the fourth indication includes and transmitting the fourth indication to the set of DUs based on the one or more RACH preambles being allocated to each DU of the set of DUs.

Some examples of the method, apparatuses, and non-transitory computer-readable medium described herein may further include operations, features, means, or instructions for receiving, from the second DU, a request to be allocated RACH preambles for the TA information acquisition, where the second indication may be transmitted in response to the request.

In some examples of the method, apparatuses, and non-transitory computer-readable medium described herein, transmitting the fourth indication may include operations, features, means, or instructions for transmitting the fourth indication via non-UE associated signaling.

In some examples of the method, apparatuses, and non-transitory computer-readable medium described herein, receiving the third indication may include operations, features, means, or instructions for receiving the third indication via non-UE associated signaling.

In some examples of the method, apparatuses, and non-transitory computer-readable medium described herein, the triggered cell switch to the first cell may be an L1 triggered cell switch or L2 triggered cell switch.

In some examples of the method, apparatuses, and non-transitory computer-readable medium described herein, the one or more RACH preambles may be allocated to a second cell associated with the second DU or to a group of cells including the second cell.

A method for wireless communications at a second DU associated with a second cell is described. The method may include receiving, from a CU associated with the second DU, a first indication of a set of RACH preambles for TA information acquisition in association with a triggered cell switch to a first cell associated with a first DU, transmitting, to a UE associated with the first cell, a second indication to transmit, to the first cell, a RACH message indicating a RACH preamble of the set of RACH preambles, receiving, from the CU, a third indication of TA information associated with the RACH message, and transmitting, to the UE, a fourth indication of the TA information.

An apparatus for wireless communications at a second DU associated with a second cell is described. The apparatus may include a processor, memory coupled with the processor, and instructions stored in the memory. The instructions may be executable by the processor to cause the apparatus to receive, from a CU associated with the second DU, a first indication of a set of RACH preambles for TA information acquisition in association with a triggered cell switch to a first cell associated with a first DU, transmit, to a UE associated with the first cell, a second indication to transmit, to the first cell, a RACH message indicating a RACH preamble of the set of RACH preambles, receive, from the CU, a third indication of TA information associated with the RACH message, and transmit, to the UE, a fourth indication of the TA information.

Another apparatus for wireless communications at a second DU associated with a second cell is described. The apparatus may include means for receiving, from a CU associated with the second DU, a first indication of a set of RACH preambles for TA information acquisition in association with a triggered cell switch to a first cell associated with a first DU, means for transmitting, to a UE associated with the first cell, a second indication to transmit, to the first cell, a RACH message indicating a RACH preamble of the set of RACH preambles, means for receiving, from the CU, a third indication of TA information associated with the RACH message, and means for transmitting, to the UE, a fourth indication of the TA information.

A non-transitory computer-readable medium storing code for wireless communications at a second DU associated with a second cell is described. The code may include instructions executable by a processor to receive, from a CU associated with the second DU, a first indication of a set of RACH preambles for TA information acquisition in association with a triggered cell switch to a first cell associated with a first DU, transmit, to a UE associated with the first cell, a second indication to transmit, to the first cell, a RACH message indicating a RACH preamble of the set of RACH preambles, receive, from the CU, a third indication of TA information associated with the RACH message, and transmit, to the UE, a fourth indication of the TA information.

In some examples of the method, apparatuses, and non-transitory computer-readable medium described herein, transmitting the fourth indication may include operations, features, means, or instructions for transmitting the fourth indication via a random access response or via a cell switch indication for the UE to switch to the second cell.

Some examples of the method, apparatuses, and non-transitory computer-readable medium described herein may further include operations, features, means, or instructions for transmitting, to the CU, a request to be allocated the set of RACH preambles for the TA information acquisition, where the first indication may be received in response to the request.

Some examples of the method, apparatuses, and non-transitory computer-readable medium described herein may further include operations, features, means, or instructions for determining that the TA information may be associated with the RACH message transmitted by the UE based on transmitting the second indication.

In some examples of the method, apparatuses, and non-transitory computer-readable medium described herein, the third indication indicates an ID of the first cell, an ID associated with the RACH preamble, an RO via which the RACH message may be received at the first DU, a time-stamp of a reception of the RACH message at the first DU, or a combination thereof.

Some examples of the method, apparatuses, and non-transitory computer-readable medium described herein may further include operations, features, means, or instructions for determining that the TA information may be associated with the RACH message transmitted by the UE based on the ID of the first cell, the ID associated with the RACH preamble, the RO, the timestamp, or a combination thereof.

In some examples of the method, apparatuses, and non-transitory computer-readable medium described herein, the first indication indicates one or more Ros that may be allocated to the second DU and the second indication indicates an RO of the one or more Ros for the UE to use to transmit the RACH message.

Some examples of the method, apparatuses, and non-transitory computer-readable medium described herein may further include operations, features, means, or instructions for receiving, from the CU, a fifth indication of second TA information associated with a second RACH message, a second RACH preamble of the set of RACH preambles and associated with the second RACH message, and a second RO via which the second RACH message may be communicated and ignoring the second TA information based on the second RO being excluded from the one or more Ros allocated to the second DU.

In some examples of the method, apparatuses, and non-transitory computer-readable medium described herein, receiving the third indication may include operations, features, means, or instructions for receiving the third indication via non-UE associated signaling.

In some examples of the method, apparatuses, and non-transitory computer-readable medium described herein, the triggered cell switch to the first cell may be an L1 triggered cell switch or L2 triggered cell switch.

In some examples of the method, apparatuses, and non-transitory computer-readable medium described herein, the set of RACH preambles may be allocated to the second cell associated with the second DU or to a group of cells including the second cell.

DETAILED DESCRIPTION

Figure 1:
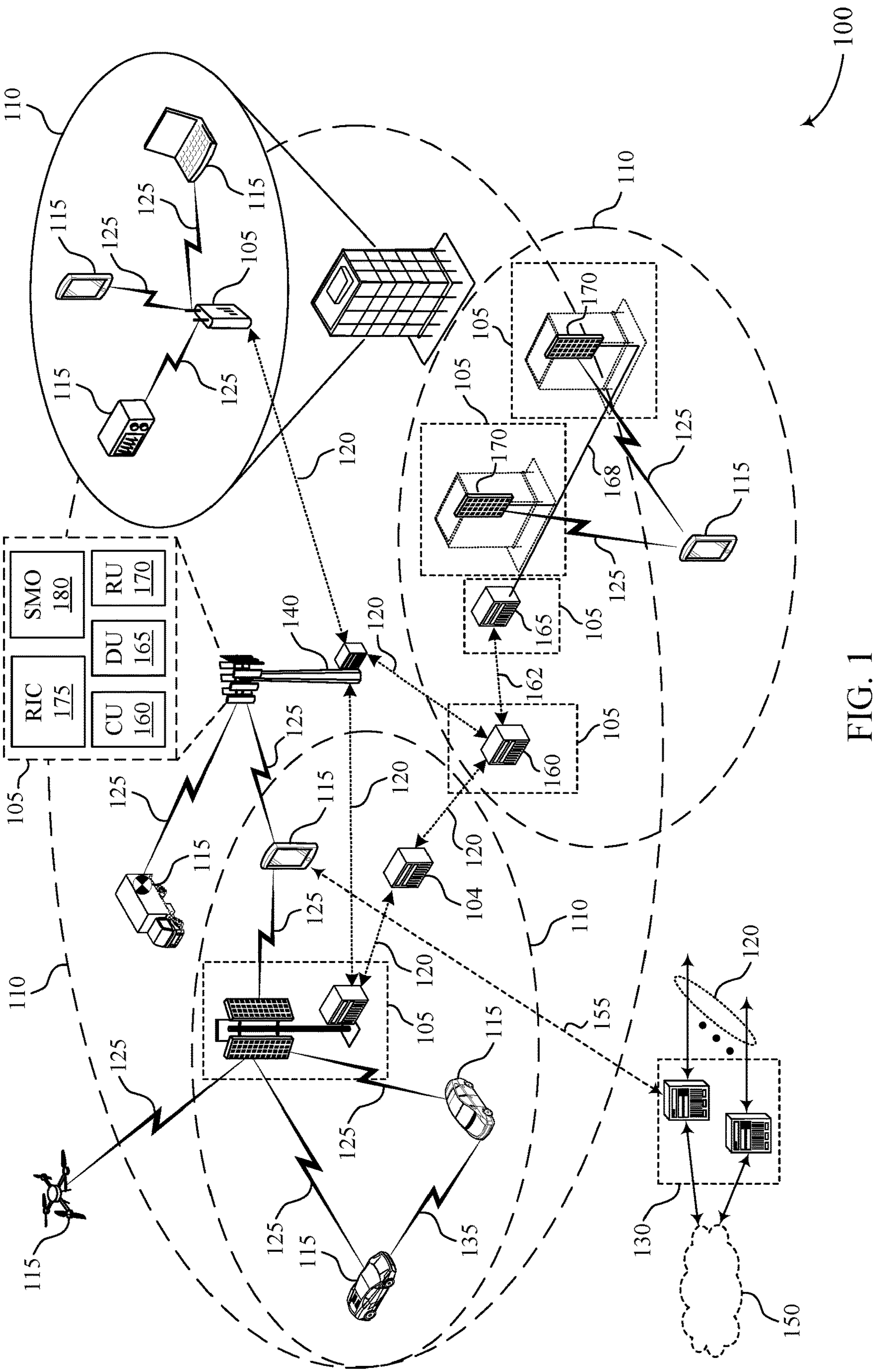
FIG. 1 shows an example of a wireless communications system that supports timing advance (TA) acquisition in layer 1 (L1)/layer 2 (L2)-triggered mobility (LTM) in accordance with one or more aspects of the present disclosure.

Some wireless communications may support cell switching via the communication of layer 1 (L1)/layer 2 (L2) signaling, which may be referred to as L1/L2 triggered mobility (LTM). LTM may reduce a latency of cell switching relative to cell switching via the communication of layer 3 (L3) signaling (such as radio resource control (RRC) signaling), for example, as L1 and L2 signaling may be communicated with reduced latency relative to the communication of L2 signaling. LTM may include a UE being indicated (e.g., configured with) one or more candidate target cells to which the UE may switch. LTM may also include early synchronization in which the UE may acquire (e.g., obtain) timing advance (TA) information acquisition before the UE is indicated (e.g., triggered) to switch to one of the candidate target cells. Such early synchronization may enable the UE to skip performing a random access channel (RACH) procedure as part of switching to the candidate target cell, which may be referred to as a RACH-less cell switch, thereby reducing a latency associated with switching to the candidate target cell.

To perform early synchronization, a first distributed unit (DU) that supports a serving cell of the UE may transmit a physical downlink control channel (PDCCH) message indicating for the UE to transmit, to a second DU (e.g., a same or different DU) that supports a candidate target cell, a physical RACH (PRACH) message via the candidate target cell that indicates (e.g., includes, corresponds to, uses) a RACH preamble. The second DU may receive and measure the PRACH message to obtain the TA information. However, the second DU may be unable to identify the UE that transmitted the PRACH message, as there may be multiple UEs for which the target cell is configured as a candidate and from which the second DU may receive respective PRACH messages. As such, the second DU may be unable to send (e.g., transmit, route, forward) the TA information to the UE (e.g., directly or indirectly, such as via the first DU), and early synchronization and RACH-less cell switching may be unsupported.

In accordance with examples described herein, the UE to which TA information corresponds may be identified at a serving cell of the UE (e.g., by the DU supporting the serving cell of the UE), and the first DU may indicate the TA information to the UE before or as part of an indication for the UE to switch to the candidate target cell. To support the identification of the UE at the serving cell, coordination between the first DU, a second DU associated with the candidate target cell, and a central unit (CU) associated with (e.g., that manages) the first and second DUs may be performed. For example, the second DU may indicate a set of RACH preambles to the CU that may be used for TA information acquisition in association with switching to the candidate target cell (e.g., a group of candidate target cells including the candidate target cell), and the CU may allocate one or more of the set of RACH preambles to the first DU. The first DU may indicate for the UE to transmit, to the second DU via the candidate target cell, a RACH message indicating a RACH preamble of the allocated RACH preambles. The second DU may receive the RACH message from the UE and measure TA information associated with the RACH message. The second DU may indicate, to the CU, the TA information along with the RACH preamble and/or an inference that the first DU ordered the transmission of the RACH message. The CU may transmit the TA information to the first DU, such as based on the allocation of the RACH preamble to the first DU and/or in accordance with the inference. The first DU may determine that the TA information is for the UE (e.g., is associated with the UE communications via the candidate target cell) and may indicate the TA information to the UE, such as via a random access response (RAR) or an indication for the UE to switch to the candidate target cell.

Alternatively, the described techniques support identification of the UE at the candidate target cell. For example, RACH preambles or RACH preamble, RACH occasion (RO) pairs may be UE-specific (e.g., uniquely allocated to a specific UE) such that the second DU may identify the UE to which the TA information corresponds. As such, the second DU may indicate the TA information to the UE (e.g., via a RAR) or may forward the TA information to the first DU (e.g., via the CU) such that the first DU may indicate the TA information to the UE. Alternatively, prior to transmission of a RACH message by the UE, the first DU may request the second DU for permission to order the UE to transmit the RACH message (e.g., indicating a particular RACH preamble, via a particular RO) such that the second DU may identify the UE to which the TA information corresponds.

Particular aspects of the subject matter described herein may be implemented to realize one or more advantages. The described techniques may support improvements in LTM mobility procedures to increase mobility support and reduce latency, among other benefits. For example, identification of the UE to which TA information corresponds may enable the provision of the TA information to the UE such that a RACH procedure may be skipped by the UE in association with switching to a candidate target cell, thereby reducing latency associated with the switch and LTM mobility, among other benefits.

Aspects of the disclosure are initially described in the context of a wireless communications system and a network architecture. Aspects of the disclosure are additionally described in the context of additional wireless communications systems and a process flow. Aspects of the disclosure are further illustrated by and described with reference to apparatus diagrams, system diagrams, and flowcharts that relate to TA acquisition in LTM.

FIG. 1 shows an example of a wireless communications system 100 that supports TA acquisition in LTM in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a CU 160, a DU 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., L3, L2) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as L1 (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled)

by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support TA acquisition in LTM as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term “cell” may refer to a logical communication entity used for communication with a network entity 105 (e.g., using a carrier) and may be associated with an identifier (ID) for distinguishing neighboring cells (e.g., a physical cell ID (PCID), a virtual cell ID (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications.

The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The wireless communications system 100 may support lower-layer triggered mobility, such as LTM, for example, to reduce latency associated with cell switching (e.g., handover). For example, a target cell may refer to a cell to which the UE 115 switches from a serving cell of the UE 115. The UE 115 may be configured with one or more candidate (e.g., potential) target cells to which the UE 115 may switch, such as based on one or more measurements of communications via the candidate target cells. In some examples, LTM may include early synchronization, which may refer to a UE 115 performing downlink synchronization and/or TA information acquisition with one or more candidate target cells before switching to a given candidate target cell. To support early TA information acquisition (e.g., acquisition of TA information before switching to the candidate target cell), the UE 115 may transmit a RACH message (e.g., a PRACH message) to a DU 165 via the candidate target cell, and the DU 165 may measure the RACH message to obtain TA information associated with the UE 115.

Techniques, systems, and devices are described herein to support the allocation of RACH preamble IDs to DUs 165 to support UE identification during early synchronization. For example, coordination between DUs 165 and a CU 160 may the routing of TA information from a first DU 165 supporting a candidate target cell to a second DU 165 supporting a serving cell such that identification of the UE 115 and provision of the TA information to the UE 115 may be performed by the second DU 165. For example, the first DU 165 may allocate a set of RACH preambles to the candidate target cell (e.g., a group of candidate target cells including the candidate target cell) and indicate the set of RACH preambles to a CU 160 that manages both the first and second DU 165. The CU 160 may allocate and indicate one or more of the RACH preambles to the second DU 165. The second DU 165 may indicate one of the indicated RACH preambles in a physical downlink control channel (PDCCH) indication for the UE 115 transmit the RACH message to first DU 165 via the candidate target cell. The UE 115 may use the indicated RACH preamble in transmitting the RACH message to the candidate target cell.

To identify and provide the TA information to the UE 115, the first DU may forward the TA information, along with an ID of the RACH preamble and/or an indication (e.g., inference) that the second DU 165 ordered the RACH message transmission, to the CU 160. The CU 160 may determine to which DU 165 the RACH preamble was allocated (e.g., the second DU 165) and may forward the TA information (e.g., and the RACH preamble ID, among other information) to the second DU 165. The second DU 165 may determine that the TA information corresponds to the UE 115, such as based on having indicated the RACH preamble in the PDCCH indication. Accordingly, if the second DU 165 triggers the UE 115 to switch to the candidate target cell, the second DU may also indicate the corresponding TA information (e.g., included in the trigger, indicated before the trigger). In this way, early synchronization may be supported. Additional details related to UE identification by a serving DU 165 are described with reference to FIGS. 3 and 4.

Alternatively, identification of the UE 115 by the first DU 165 (e.g., at the candidate target cell) may be supported. For example, unique RACH preambles or RACH preamble, RACH occasion (RO) pairs may be allocated to each UE 115 such that the first DU 165 (e.g., associated with the candidate target cell) may identify the UE 115 to which the TA information corresponds. As such, the first DU 165 may indicate the TA information to the UE 115 (e.g., via a RAR) or may forward the TA information to the first DU 165 (e.g., via the CU 160) such that the first DU 165 may indicate the TA information to the UE 115 to support early synchronization. Alternatively, prior to transmission of the RACH message by the UE 115, the second DU 165 may request the first DU 165 for permission to order the UE 115 to transmit the RACH message (e.g., using a particular RACH preamble, via a particular RO) such that the first DU 165 may identify the UE 115 to which the TA information corresponds. Additional details related to UE identification by a candidate target DU 165 are described with reference to FIG. 5.

Figure 2:
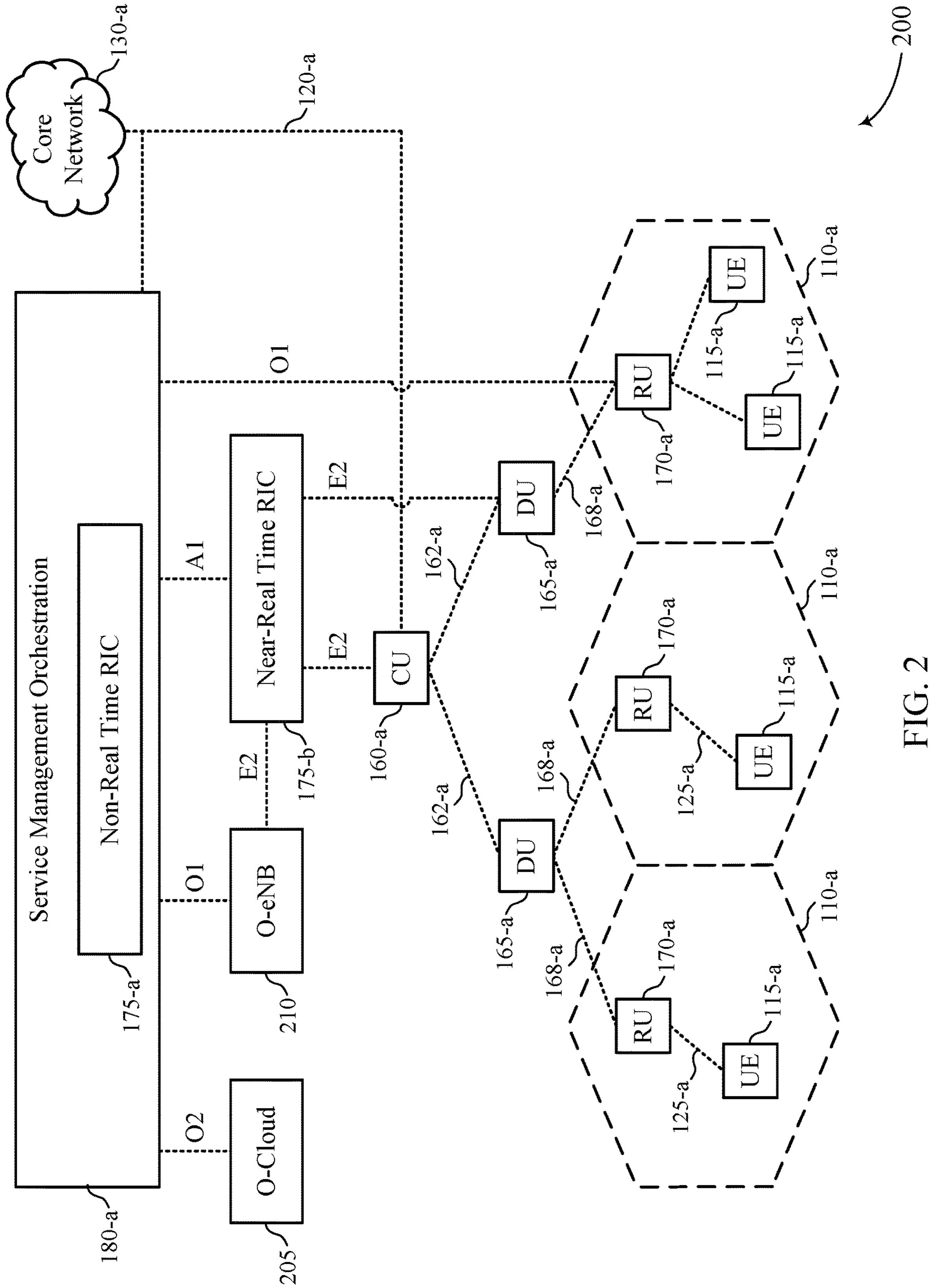
FIG. 2 shows an example of a network architecture that supports TA acquisition in LTM in accordance with one or more aspects of the present disclosure.

FIG. 2 shows an example of a network architecture 200 (e.g., a disaggregated base station architecture, a disaggregated RAN architecture) that supports TA acquisition in LTM in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, PRACH extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an AI interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via 01) or via generation of RAN management policies (e.g., AI policies).

The network architecture 200 may support LTM procedures, including early acquisition of TA information. In accordance with examples described herein, the CU 160-*a* and DUs 165-*a* may support the identification of UEs 115 to which TA information corresponds to support early synchronization and RACH-less cell switching.

Figure 3:
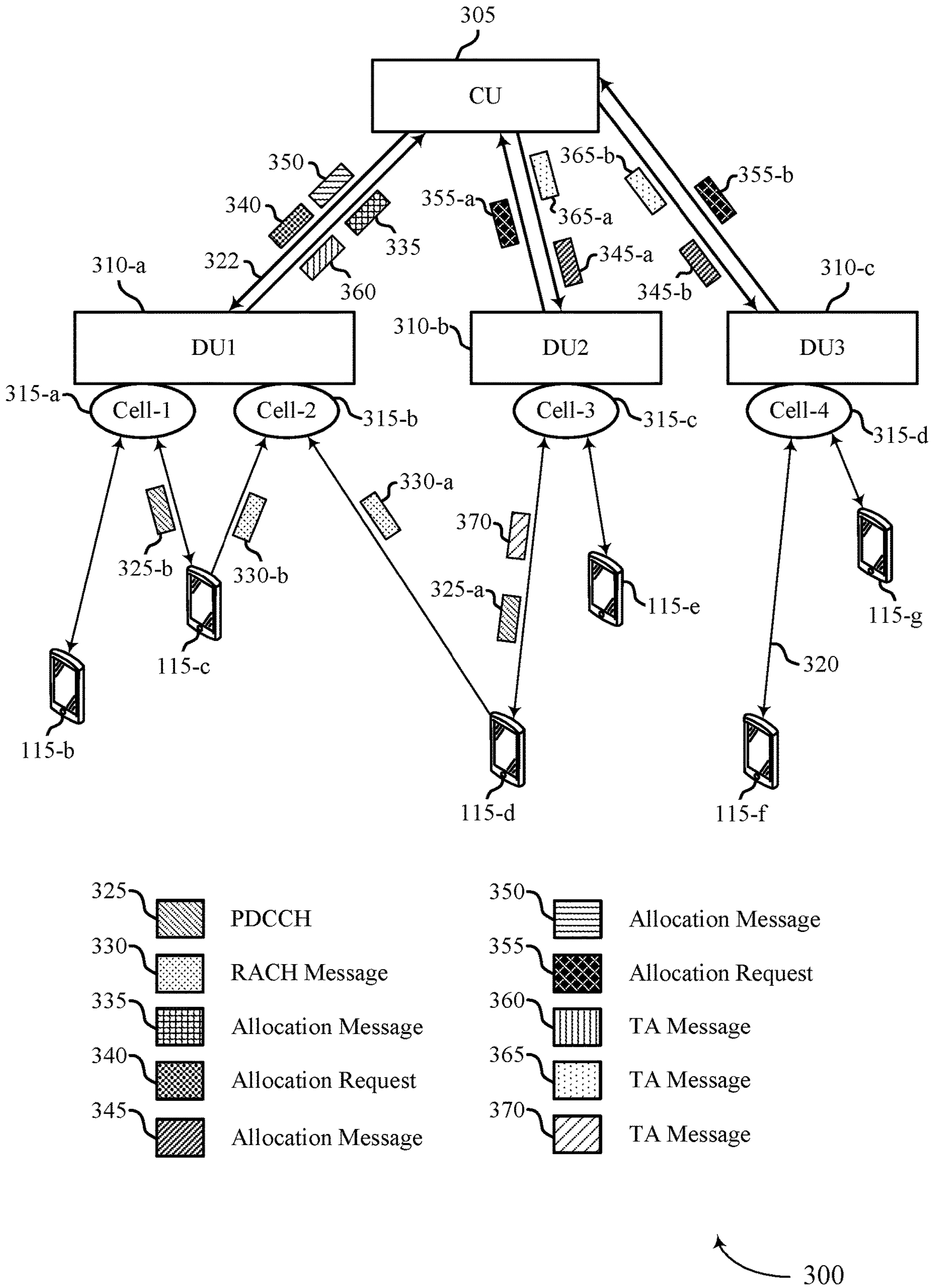
FIG. 3 shows an example of a wireless communications system that supports TA acquisition in LTM in accordance with one or more aspects of the present disclosure.

FIG. 3 shows an example of a wireless communications system 300 that supports TA acquisition in LTM in accordance with one or more aspects of the present disclosure. The wireless communications system 300 may implement or be implemented by aspects of the wireless communications system 100 or the network architecture 200, as described with reference to FIGS. 1 and 2, respectively. For example, the wireless communications system 300 may include a CU 305, one or more DUs 310, and one or more UEs 115, which may be examples of corresponding devices as described with reference to FIGS. 1 and 2. In the example of FIG. 3, the CU 305 and one or more DUs 310 may support the identification of a UE 115 to which TA information corresponds at serving cell of the UE 115 (e.g., by a DU serving the UE 115), which may enable the provision of the TA information to the UE 115 prior to the UE switching to a candidate target cell to support RACH-less cell switching.

In the example of FIG. 3, the wireless communications system 300 may include the CU 305, a DU1 310-*a*, a DU2 310-*b*, and a DU3 310-*c*. The DU1 310-*a* may support (e.g., serve) one or more cells 315, including a cell-1 315-*a* and a cell-2 315-*b* in the example of FIG. 5. The DU1 310-*a* may also serve one or more UEs 115 via the one or more cells 315, such as a UE 115-*b* and a UE 115-*c* via the cell-1 315-*a*. In other words, the UE 115-*b* and the UE 115-*c* may communicate with the DU1 310-*a* via the cell-1 315-*a* (e.g., via respective communication links 320, which may be examples of communications links 125). The DU2 310-*b* and the DU3 310-*c* may each support one or more cells 315, such as a cell-3 315-*c* and cell-4 315-*d*, respectively, in the example of FIG. 5. The DU2 310-*b* and the DU3 310-*c* may also each serve one or more UEs 115 via the one or more cells 315, such as a UE 115-*d* and a UE 115-*e* via the cell-3 315-*c* and a UE 115-*f* and a UE 115-*g* via the cell-4 315-*d*. The CU 305 may manage the DU1 310-*a*, the DU2 310-*b*, and the DU3 310-*c*. In some examples, the CU 305 may communicate with the DUs 310 via respective midhaul communication links 322 (e.g., F1 signaling, an F1 interface), which may be examples of midhaul communication links 162.

The wireless communications system 300 may support lower layer supported mobility (e.g., handover, cell switching), such as LTM. As part of LTM, the UEs 115 may be configured with (e.g., indicated by respective serving DUs 310) one or more candidate target cells to which the UEs 115 may switch. In the example of FIG. 3, the UEs 115 may be configured with the cell-2 315-*b* as a candidate target cell. Various RACH scenarios may be supported in association with a UE 115 switching to the cell-2 315-*b*. For example, both RACH-based (e.g., contention free random access (CFRA), contention-based random access (CBRA)) and RACH-less procedures may be supported to perform a switch to the cell-2 315-*b*.

A RACH-based procedure may include a UE 115 performing a RACH procedure (e.g., a two-step RACH procedure, a four-step RACH procedure) with a candidate target cell 315 (e.g., a DU 310 via the candidate target cell 315, such as the DU1 310-*a* via the cell-2 315-*b*) in response to receiving a command from a serving DU 310 to switch to the candidate target cell 315. The UE 115 may perform the RACH procedure to perform downlink synchronization with DU 310 via the candidate target cell 315 and/or obtain TA information associated with communicating (e.g., uplink communications) via the candidate target cell 315, among other purposes.

A RACH-less procedure may include the UE 115 skipping performing the RACH procedure. Instead, TA information may be obtained (e.g., acquired) prior to switching to the candidate target cell 315 such that the UE 115 may switch to the candidate target cell 315 without performing the RACH procedure. For example, cross-cell PDCCH-ordered RACH for early TA information acquisition may be performed before LTM triggering. For instance, a serving DU 310 may transmit a PDCCH 325 (e.g., a message via a PDCCH) indicating (e.g., ordering) for a UE 115 to transmit a RACH message to a candidate DU 310 via the candidate target cell 315. The candidate DU 310 may measure the RACH message to determine (e.g., compute, calculate) the TA information. The UE 115 may be indicated the TA information. Otherwise, the RACH-less procedure may be unsupported, as the UE 115 may not know what the TA information is.

However, the candidate DU 310 may be unable to identify the UE 115 that transmitted the RACH message such that the TA information may be indicated to the UE 115. For example, RACH preamble indices and ROs with associated synchronization signal block (SSB) indices may be configured for each candidate target cell 315. For cross-cell early TA acquisition, the candidate target cell 315 may be a non-serving cell 315 for the UEs 115 ordered to perform early TA acquisition, and in some cases, may thus be unable to identify which UE 115 is performing the early TA acquisition at a given time. As such, if the DU2 310-*a* indicates for the UE 115-*d* to transmit a RACH message 330-*a* to the cell-2 315-*b* served by the DU 310-*a* (e.g., to the DU1 310-*a* via the cell-2 315-*b*), the DU1 310-*a* may be unable to distinguish whether the RACH message 330-*a* was transmitted by the UE 115-*d* or some other UE 115 within the wireless communications system 300 for which the cell-2 315-*b* is configured as a candidate target cell 315. Thus, early TA information acquisition and RACH-less cell switching may be unsupported. However, RACH-less cell switching may be associated with a lower latency relative to RACH-based cell switching due to skipping the RACH procedure. Accordingly, techniques to support early TA information acquisition may be desired.

To support UE identification in association with early TA information acquisition, the DUs 310 and the CU 305 may coordinate the allocation of RACH preambles to serving DUs 310 such that a DU 310 that ordered a UE 115 to send a RACH message 330 as part of early TA acquisition may be identified. The DU 310 that ordered the UE 115 to send the RACH message 330 may then identify and indicate corresponding TA information to the UE 115.

For example, to support early TA information acquisition in association with switching to the cell-2 315-*b*, the DU1 310-*a* may allocate a list of dedicated RACH preambles for the sake of early TA acquisition and provide the list to the CU 305. For instance, the DU1 310-*a* may transmit an allocation message 335 to the CU 305 that indicates a set of RACH preambles (e.g., the list of dedicated RACH preambles) for TA information acquisition in association with a triggered cell switch (e.g., L1-triggered cell switch, L2-triggered cell switch, LTM cell switch) to the cell-2 315-*b* (e.g., a group of cells 315 that includes the cell-2 315-*b*). In some examples, the set of RACH preambles may be a subset of a total quantity of RACH preambles. For example, the DU1 310-*a* may select the subset of the total quantity RACH preambles for the purposes of early TA acquisition via the cell-2 315-*b*.

In some examples, the CU 305 may have requested the allocation of the list of RACH preambles (e.g., including a quantity of preamble IDs) for a given candidate target cell 315, such as the cell-2 315-*b*. For example, the CU 305 may transmit an allocation request 340 to the DU1 310-*a* that requests the DU1 310-*a* to allocate the set of RACH preambles for the TA information acquisition associated with the cell-2 315-*b*. Here, the DU1 310-*a* may transmit the allocation message 335 in response to the allocation request 340. In some examples, the allocation request 340 may include an indication of a quantity of RACH preambles to be included in the set of RACH preambles. In some examples, the DU1 310-*a* may select the subset of the total quantity of RACH preambles in accordance with the indicated quantity. That is, the set of RACH preambles including the indicated quantity of RACH preambles may be less than the total quantity of RACH preambles and selected from the total quantity of RACH preambles in accordance with the indicated quantity.

The CU 305 may partition the list of dedicated RACH preambles and configure each partition on the other DUs 310 (e.g., at least the DUs 310 which may serve UEs 115 with which cell-2 315-*b* was configured as a candidate target cell 315). For example, the CU 305 may allocate one or more respective RACH preambles of the set of RACH preambles to the DU2 310-*b*, the DU3 310-*c*, or both. The CU 305 may indicate the respective allocations via respective allocation messages 345. For example, the CU 305 may transmit an allocation message 345-*a* to the DU2 310-*b* that indicates one or more respective RACH preambles of the set of RACH preambles allocated to the DU2 310-*b*. Additionally or alternatively, the CU 305 may transmit an allocation message 345-*b* to the DU3 310-*c* that indicates one or more respective RACH preambles allocated to the DU3 310-*c*. In some examples, the allocation messages 345 may indicate the one or more respective RACH preambles by indicating (e.g., including) RACH preamble IDs of the one or more respective RACH preambles.

In some examples, the allocation of the respective one or more RACH preambles may be non-overlapping. That is, the CU 305 may allocate respective non-overlapping subsets of the set of RACH preambles to respective DUs 310. In some examples, the allocation of the respective one or more RACH preambles may be at least partially overlapping. For example, one or more of the RACH preambles allocated to the respective DUs 310 (e.g., the DU2 310-*b* and the DU3 310-*c*) may be common to multiple DUs 310.

In some examples, allocations of respective one or more RACH preambles may be per-DU 310 or per serving cell 315. For example, DUs 310 may support one or more cells 315, and allocations of the respective one or more RACH preambles may be on a per-DU basis (e.g., usable by any UE 115 served by the DU 310) or on a per serving cell basis. In some examples, allocations of respective one or more RACH preambles may for a group of one or more serving cells 315.

In some examples, the configuration of a partition on a DU 310 may be requested by respective DUs 310 (e.g., with a corresponding size of the partition). For example, one or more DUs 310 (e.g., the DU2 310-*b*, the DU3 310-*c*) may transmit an allocation request 355 (e.g., an allocation request 355-*a*, an allocation request 355-*b*) to the CU 305 requesting for a respective allocation of one or more RACH preambles for TA information acquisition in association with switching to the cell-2 315-*b*. In some examples, the allocation request 355 may include a requested quantity of RACH preambles to be allocated to the respective DU 310. In some examples, the CU 305 may transmit the allocation request 340 to the DU1 310-*a* in response to one or more allocation requests 355. In some examples, the allocation request 340 may include a list of identifiers of the one or more DUs 310 associated with the allocation request 355 (e.g., an allocation request 355-*a*, an allocation request 355-*b*).

At any point in time, any of the DUs 310 (e.g., DU2 310-*b*, DU3 310-*c*) allocated with one or more of the set of RACH preambles who wants to order one of its served UEs 115 to send a RACH message 330 towards cell-2 315-*b* may dynamically select one of the allocated RACH preambles associated with cell-2 315-*b* that have been configured to that DU 310. The DU 310 may indicate the served UE 115 to use the selected RACH preamble in transmitting the RACH message towards cell-2 315-*b*. For example, the DU2 310-*b* may transmit a PDCCH 325-*a* to the UE 115-*d* that indicates for the UE 115-*d* to transmit a RACH message 330-*a* for the purposes of acquiring TA information associated with communicating via the cell-2 315-*b*. That is, the PDCCH 325-*a* may indicate for the UE 115-*d* to transmit the RACH message 330-*a* to the cell-2 315-*b* such that the DU1 310-*a* may measure (e.g., determine, compute, calculate) the TA information. In some examples, a PDCCH 325 may indicate for a given UE 115 to transmit a RACH message 330 to a candidate target cell 315 (e.g., rather than to a DU 310 serving the cell 315), for example, as the network architecture (e.g., the architecture including the CU 305 and the DUs 310) may be transparent to the UE 115 while cells 315 may be known (e.g., known entities) to the UE 115. The PDCCH 325-*a* may include an indication of the selected RACH preamble (e.g., an ID of the RACH preamble) that the UE 115-*d* is to use in transmitting the RACH message 330-*a*.

In response to the PDCCH 325-*a*, the UE 115-*d* may transmit, to the DU1 310-*a*, the RACH message 330-*a* (e.g., a PRACH) corresponding to the indicated RACH preamble ID. For example, the RACH message 330-*a* may indicate (e.g., include, correspond to, include a sequence of symbols corresponding to or indicative of) the indicated RACH preamble. In some examples, the UE 115-*d* may transmit the RACH message 330-*a* via (e.g., using) a configured RO (e.g., configured via RRC signaling) or via an RO indicated via the PDCCH 325-*a*.

The DU1 310-*a* may receive the RACH message 330-*a* via the cell-2 315-*b* and compute the TA information (e.g., the TA value). The use of the RACH preamble allocated to the DU2 310-*b* may support the identification of the UE 115-*d* as the UE 115 that transmitted the RACH message 330-*a* and thus to which the TA information corresponds. For example, the DU1 310-*a* may share the result of the TA computation with the CU 305. For instance, the DU1 310-*a* may transmit a TA message 360 to the CU 305 that indicates the TA information associated with the RACH message 330-*a*. In some examples, the DU1 310-*a* may transmit the TA message 360 to the CU 305 via non-UE associated signaling, such as F1 signaling that non-UE associated (e.g., the F1 signaling does not specify that the TA message 360 is associated with a particular UE 115). For example, an F1 application-protocol (AP) message that includes (e.g., carries) the TA message 360 may exclude an AP specific UE ID associated with the particular UE 115.

In some examples, the TA message 360 may include information that enables the CU 305 to identify that DU2 310-*b* as being the DU 310 that ordered the transmission of the RACH message 330-*a*. For example, the TA message 360 may include an ID of the cell-2 315-*b* and an indication of the RACH preamble indicated by the RACH message 330-*a* (e.g., an ID of the RACH preamble). The CU 305 may determine that the RACH preamble is allocated to the DU2 310-*b* for TA information acquisition associated with the cell-2 315-*b*. Accordingly, using the ID of the cell-2 315-*b* and the ID of the RACH preamble, the CU 305 may determine that the DU2 310-*b* ordered the transmission of the RACH message 330-*a*.

In some examples, the TA message 360 may include an indication (e.g., inference) of which DU 310 ordered the transmission of the RACH message 330-*a*. For example, the DU1 310-*a* may make an inference that the DU2 310-*b* ordered the transmission of the RACH message 330-*a* and convey the inference to the CU 305 via the TA message 360. To support such inference making by the DU1 310-*a*, the CU 305 may indicate the partitions of the set of RACH preambles allocated to one or more of the other DUs 310. For example, the CU 305 may transmit an allocation message 350 to the DU1 310-*a* that indicates the one or more respective RACH preambles allocated to the DU2 310-*b* and the DU3 310-*c*. The DU1 310-*a* may determine that the RACH message 330-*a* was ordered by the DU2 310-*b* based on the RACH preamble indicated by the RACH message 330-*a* and reception of the RACH message 330-*a* via the cell-2 315-*b*. For example, DU1 310-*a* may determine the RACH preamble as being included in the one or more RACH preambles allocated to the DU2 310-*b* for TA information acquisition associated with the cell-2 315-*b* and may thus infer that the RACH message 330-*a* was ordered by the DU2 310-*b*. In some examples, if the RACH preamble is allocated to multiple DUs 310 (e.g., overlapping allocations of the RACH preamble), the DU1 310-*a* may include an indication of the multiple DUs 310 that may have ordered the RACH message 330-*a* transmission.

In some examples, the TA message 360 may include information that enables the identification of the DU 310 that ordered the RACH message 330-*a* if the RACH preamble is allocated to multiple DUs 310. For example, a combination of a DU-specific RACH mask and a RACH preamble ID may uniquely identify the DU 310 that ordered the RACH message 330-*a* if the RACH preamble is allocated to multiple DUs 310. For instance, allocating a RACH preamble ID to multiple DUs 310 may imply that multiple DUs 310 potentially ordered a served UE 115 to transmit the RACH message 330-*a*. DU-specific RACH masks indicating one or more respective non-overlapping ROs that are allocated to a respective DU 310 may support differentiating between which of the multiple DUs 310 ordered the RACH message 330-*a*. For example, the allocation messages 345 may allocate respective sets of non-overlapping ROs to the DU2 310-*a* and the DU3 310-*c* that the DUs 310 may indicate for respective served UEs 115 to use to transmit respective RACH messages 330.

The PDCCH 325-*a* may indicate one of the ROs allocated to the DU2 310-*a* that the UE 115-*d* is to use to transmit the RACH message 330-*a* (e.g., via which the UE 115-*d* is to transmit the RACH message 330-*a*). Accordingly, even if the RACH preamble indicated by the RACH message 330-*a* is allocated to multiple DUs 310, the unique RACH preamble and RO pair allocated to the DU2 310-*a* may enable the CU 305 to determine that the DU2 310-*a* ordered the transmission of the RACH message 330-*a*. In some examples, the allocation message 350 may indicate the respective sets of non-overlapping ROs to the DU2 310-*a* and the DU3 310-*c* such that the DU1 310-*a* may similarly infer (e.g., determine) which DU 310 ordered the transmission of the RACH message 330-*a*.

The CU 305 may forward the TA information (e.g., the TA value) to the DU2 310-*b*. For example, based on the determination that the DU2 310-*b* ordered the transmission of the RACH message 330-*a*, the CU 305 may transmit a TA message 365-*a* to the DU2 310-*b* that indicates the TA information. In some examples, the DU2 310-*b* may determine that the TA information corresponds to the UE 115-*d* (e.g., is associated with the RACH message 330-*a* transmitted by the UE 115-*d*) based on the transmission of the PDCCH 325-*a*. For example, the DU2 310-*b* may know (e.g., track) which UEs 115 it has ordered to transmit RACH messages 330 and may thus determine that the TA information corresponds to the UE 115-*d*. In some examples, the CU 305 may transmit the TA message 365-*a* to the DU2 310-*b* via non-UE associated signaling.

In some examples, the CU 305 may forward the TA value together with (e.g., the TA message 365-*a* may include) the ID of the cell-2 315-*b*, the detected RACH preamble ID (e.g., an indication of the RACH preamble indicated by the RACH message 330-*a*), the RO via which the RACH message 330-*a* was received at the DU1 310-*a*, or a combination thereof, to support the determination that the TA information corresponds to the UE 115-*d*. For example, the DU2 310-*b* may know which UE 115 served by the DU2 310-*b* was ordered to send a RACH message 330 to (e.g., via) the cell-2 315-*b*, using the detected RACH preamble ID, via the indicated RO, or a combination thereof, and may thus determine that the TA information corresponds to the UE 115-*d*.

In some examples, the TA message 360 and the TA message 365-*a* may include other information that enables the DU2 310-*b* to identify to which UE 115-*d* the TA information corresponds. For example, the TA message 360 and the TA message 365 may include a timestamp of a reception of the RACH message 330-*a* at the DU1 310-*a*. The DU2 310-*b* may know when the UE 115-*d* was ordered to transmit the RACH message 330-*a*. As such, the DU2 310-*b* may use the timestamp to determine that TA information corresponds to the RACH message 330-*a* and thus that the TA information corresponds to the UE 115-*d*.

In some examples, the CU 305 may share (e.g., transmit, forward) the TA value with multiple DUs 310. For example, if the RACH preamble is allocated to multiple DUs 310, the CU 305 may transmit respective TA messages 365 to the multiple DUs 310 (e.g., the TA message 365-*a* to the DU2 310-*b*, a TA message 365-*b* to the DU3 310-*c*). The DUs 310 may use the information in the TA message 365 to determine whether the TA information corresponds to a RACH message 330 ordered by the DU 310. Those DUs 310 that did not order a RACH message 330 transmission may neglect (e.g., ignore) the TA information. For example, the DU3 310-*c* that did not order the transmission of the RACH message 330-*a* may ignore the TA information indicated by the TA message 365-*b*. In some examples, the DU3 310-*c* may determine that the DU3 310-*c* did not order the transmission of the RACH message 330-*a* based on an RO being excluded from one or more ROs allocated to the DU3 310-*c* for TA acquisition associated with the cell-2 315-*b*.

The DU2 310-*b* may share the TA information with the UE 115-*d* according to various techniques. For example, the DU2 310-*b* may transmit a TA message 370 to the UE 115-*d* that indicates the TA information. In some examples, the TA message 370 may be included in a random access response (RAR) associated with the RACH message 330-*a*. For example, the UE 115-*d* may be configured with a RAR window during which the UE 115-*d* may receive a RAR in response to the transmission of the RACH message 330-*a*. In some examples, the DU2 310-*b* may transmit the TA message 370 via a RAR during the RAR window. In some other examples, the TA message 370 may be included in a cell switch indication for the UE 115-*d* to switch to the cell-2 315-*b*. For example, the DU2 310-*b* may transmit the TA message 370 via the cell switch indication (such as via L2 signaling, including a MAC control element (MAC CE), or L1 signaling).

The UE 115-*d* may receive the cell switch indication and switch to the cell-2 315-*b* in accordance with the indicated TA information. The DU1 310-*a* and the UE 115-*d* may communicate via the cell-2 315-*b* in accordance with the indicated TA information.

In some examples, the set of RACH preambles indicated to the CU 305 by the DU1 310-*a* may be for allocation to DUs 310 other than the DU1 310-*a*. For example, the DU1 310-*a* may allocate a second set of RACH preambles for TA acquisition in association with switching to the cell-2 315-*b*. The second set of RACH preambles may be allocated to other cells 315 served by the DU1 310-*a*. For example, the DU1 310-*a* may allocate the second set of RACH preambles to the cell-1 315-*a*. The DU1 310-*a* may order UEs 115 served by the DU1 310-*a* via the cell-1 315-*a* to use a RACH preamble of the second set of RACH preambles in transmitting a RACH message 330 to (e.g. via) the cell-2 315-*b*. For example, the DU1 310-*a* may transmit a PDCCH 325-*b* to the UE 115-*c* that indicates for the UE 115-*c* to transmit a RACH message 330-*b* to the cell-2 315-*b*. The PDCCH 325-*b* may indicate a RACH preamble of the second set of RACH preambles for the UE 115-*c* to use to transmit the RACH message 330-*b*. Because the RACH preamble is included in the second set of RACH preambles allocated by the DU1 310-*a*, the DU1 310-*a* may determine, based on the RACH preamble, that the DU1 310-*a* ordered the transmission of the RACH message 330-*b* and that the TA information corresponds to the UE 115-*c*. In some examples, the second set of RACH preambles may be excluded from the set of RACH preambles indicated to the CU 305 (e.g., may be exclusive to the cell-1 315-*a*).

Figure 4:
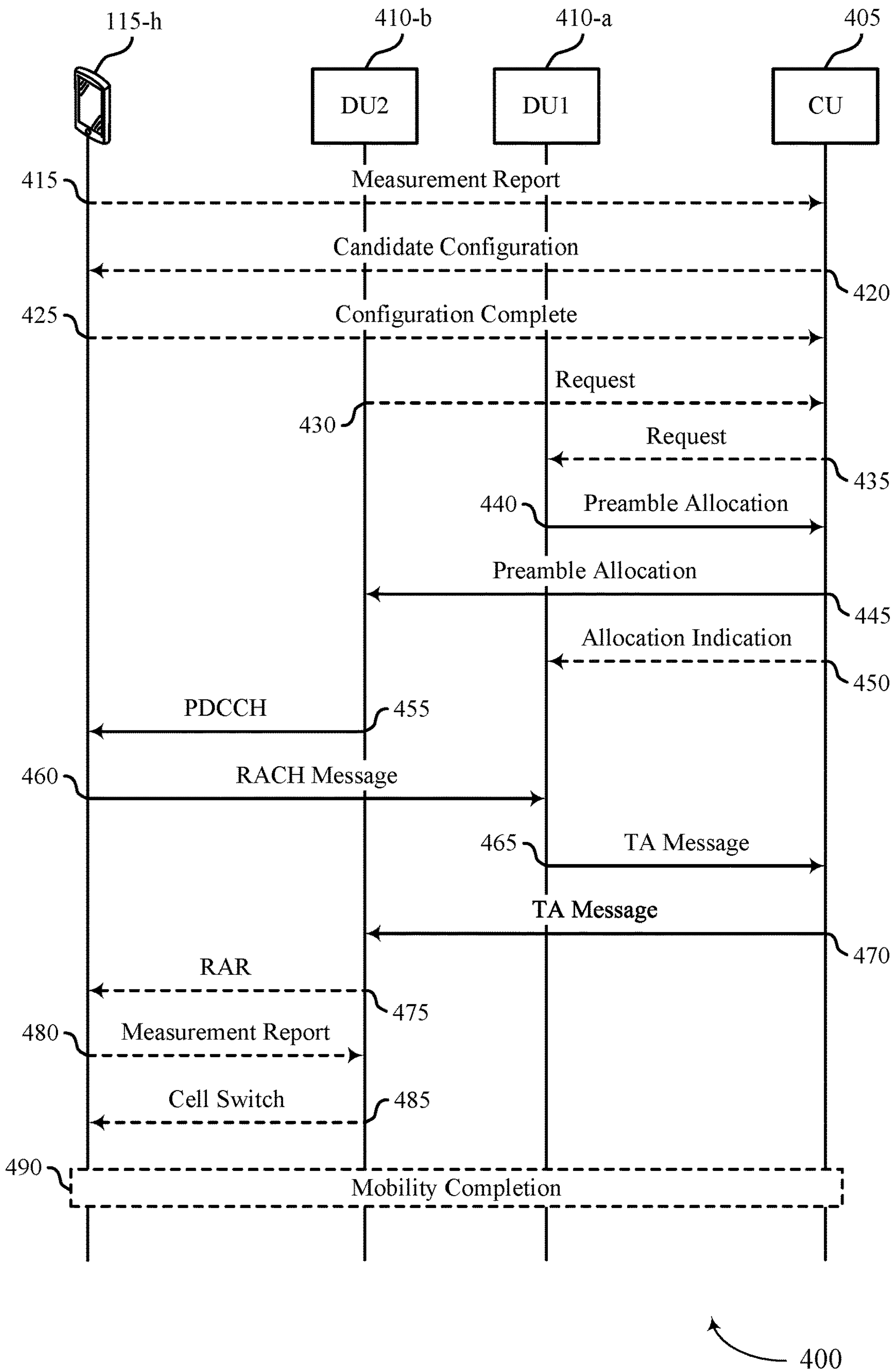
FIG. 4 shows an example of a process flow that supports TA acquisition in LTM in accordance with one or more aspects of the present disclosure.

FIG. 4 shows an example of a process flow 400 that supports TA acquisition in LTM in accordance with one or more aspects of the present disclosure. In some examples, process flow 400 may implement aspects of the wireless communications system 100, network architecture 200, or wireless communications system 300. For example, the process flow 400 may support early TA acquisition. The process flow may include a CU 405, a DU1 410-*a*, a DU2

410-*b*, and a UE 115-*h*, which may be examples of corresponding devices herein, including with reference to FIGS. 1 through 3.

In the following description of process flow 400, the operations between the CU 405, the DU1 410-*a*, the DU2 410-*b*, and the UE 115-*h* may be transmitted in a different order than the order shown, or other operations may be added or removed from the process flow 400. For example, some operations may also be left out of process flow 400, or may be performed in different orders or at different times. Further, although some operations or signaling may be shown to occur at different times for discussion purposes, these operations may actually occur at the same time. Although the CU 405, the DU1 410-*a*, the DU2 410-*b*, and the UE 115-*h* are shown performing the operations of process flow 400, some aspects of some operations may also be performed by one or more other wireless or network devices.

At 415, the UE 115-*h* may transmit a measurement report to the CU 405 via the DU2 410-*b*. For example, the UE may send a MeasurementReport message to the CU 405 via the DU2 410-*b* that indicates one or more measurements associated with one or more neighboring cells, including a first cell served by the DU1 410-*a*. The measurement report may be an RRC measurement report (e.g., transmitted via RRC signaling).

At 420, the CU 405 may transmit a candidate configuration message to the UE 115-*h* via the DU2 410-*b*. For example, based on the measurement report, the CU 405 may decide to use LTM and initiate LTM candidate preparation. The CU 405 may transmit, via the DU2 410-*b*, an RRC message (e.g., an RRCReconfiguration message) to the UE 115-*h* including a configuration of one or more candidate target cells. In the example of FIG. 4, the RRC message may indicate the first cell served by the DU1 410-*a* as a candidate target cell for the UE 115-*h*, such as based on the measurement report.

At 425, the UE 115-*h* may transmit configuration complete message to the CU 405 via the DU2 410-*b*. For example, the UE 115-*h* may store the configuration of the one or more candidate target cells and transmit an RRC message (e.g., an RRCReconfigurationComplete message) to the CU 405 via the DU2 410-*b* indicating that the configuration of the one or more candidate target cells at the UE 115-*h* is complete.

At 430, the DU2 410-*b* may request allocation of one or more RACH preambles for TA acquisition in association with triggered cell switching to the first cell associated with (e.g., served by) the DU1 410-*a* or a first group of cells including the first cell. For example, the DU2 410-*b* may transmit a request to the CU 405 that the CU 405 allocate the one or more RACH preambles to the DU2 410-*b*. In some examples, the request may include a requested quantity of RACH preambles to be allocated to the DU2 410-*b*.

At 435, the CU 405 may request (e.g., in response to the request from the DU2 410-*b*) the DU1 410-*a* to allocate a set of RACH preambles for the TA acquisition in association with triggered cell switching to the first cell or first group of cells. For example, the CU 405 may transmit a request to the DU1 410-*a* to allocate the set of RACH preambles and indicate the allocation of the set of RACH preambles to the CU 405. In some examples, the request to DU1 410-*a* may include an identifier of the DU requesting allocation of the one or more RACH preambles for TA acquisition in association with triggered cell switching to the first cell or group of cells (e.g. such as an identifier of the DU2 410-*b*). In some examples, the request may indicate the quantity of RACH preambles for the DU1 410-*a* to allocate. In some examples, the CU 405 may receive respective allocation requests from multiple DUs 410. In such cases, the request to DU1 410-*a* may include a list of the identifiers of the multiple DUs 410, wherein one or more responses may allocate one or more random access resource per member of the list. In some examples, the quantity of RACH preambles for the DU1 410-*a* to allocate may equal a sum of the requested quantities of RACH preambles to be allocated to one or more DUs 410 (e.g., including the DU2 410-*b*).

At 440, the DU1 410-*a* may allocate the set of RACH preambles (e.g., in response to the request from the CU 405) and transmit an indication of the set of RACH preambles to the CU 405. In some examples, such as when the request from the CU 405 includes a list of multiple DUs 410 requesting allocations of RACH resources, the DU1 410-*a* may allocate multiple sets of RACH preambles, where each of the multiple sets of RACH preambles is allocated to a respective one of the multiple DUs indicated in the request from the CU 405. In some examples, the set of RACH preambles may include the quantity of RACH preambles indicated in the request from the CU 405.

At 445, the CU 405 may allocate the one or more RACH preambles of the set of RACH preambles to the DU2 410-*b*. In some cases, the CU 405 may allocate one or more RACH preambles of the multiple set of RACH preambles to the multiple DUs 410 indicated in the request from the CU 405. For example, the CU 405 may transmit a preamble allocation message that indicates the allocation of the one or more RACH preambles to the DU2 410-*b*. In some examples, the one or more RACH preambles may be allocated to a second cell served by the DU2 410-*b* (e.g., may be a serving cell specific allocation) or a second group of cells including the second cell. In some examples, the allocation of the one or more RACH preambles (e.g., the preamble allocation message) may include a list of UEs 115 (e.g., including the UE 115-*h*) that the DU2 410-*b* may order to transmit RACH messages to the first cell served by the DU1 410-*a* (e.g., the DU1 410-*a* via the first cell). In some examples, the one or more RACH preambles may be exclusive (e.g., specific) to the DU2 410-*b*. In some examples, one or more of the RACH preambles allocated to the DU2 410-*b* may be shared with (e.g., common to) respective RACH preamble allocations to other DUs 410. In some examples, the preamble allocation message may also allocate one or more ROs to the DU2 410-*b* via the DU2 410-*b* may order UEs 115 (e.g., the UE 115-*h*) to transmit RACH messages to the first cell. In some cases, the if the CU 405 asks one DU 410 to allocate RACH resources for other DUs, a request may be separately made for each of those other DUs, or a request may include a list of those DUs upfront. In latter case (e.g., when the request include a list of those DUs upfront), a DU 410 performing the allocation may return sets of RACH resources per each of those other DUs.

At 450, the CU 405 may indicate to the DU1 410-*a* how the set of RACH preambles are allocated for the TA acquisition. For example, the CU 405 may transmit an allocation indication that indicates the one or more RACH preambles as being allocated to the DU2 410-*b*.

At 455, the DU2 410-*b* may indicate for the UE 115-*h* to perform early TA acquisition with the first cell served by the DU1 410-*a*. For example, the DU2 410-*b* may transmit a PDCCH message to the UE 115-*h* that orders the UE 115-*h* to transmit a RACH message to the first cell. The PDCCH message may indicate a RACH preamble of the one or more RACH preambles to be indicated by the RACH message (e.g., that the UE 115-*h* is to use to transmit the RACH message). In some examples, the PDCCH message may indicate an RO of the one or more ROs via which the UE 115-*h* is to transmit the RACH message. The PDCCH message may indicate the RO via a RACH mask.

At 460, the UE 115-*h* may transmit the RACH message to first cell (e.g., the DU1 410-*a* via the first cell). For example, in response to the PDCCH message, the UE 115-*h* may transmit the RACH message indicating the preamble (e.g., via the indicated RO) to the first cell.

At 465, the DU1 410-*a* may indicate TA information associated with the RACH message to the CU 405. For example, the DU1 410-*a* may compute the TA information based on the RACH message and transmit a TA message to the CU 405 that indicates the TA information. In some examples, the TA message may indicate: an ID of the first cell; the RACH preamble indicated by the RACH message; the RO via which the RACH message is received; a timestamp at which the RACH message is received; that the DU2 410-*b* ordered the transmission of the RACH message; or a combination thereof.

At 470, the CU 405 may indicate that TA information to the DU2 410-*b*. For example, the CU 405 may determine that the DU2 410-*b* ordered the transmission of the RACH message based on the ID of the first cell, the RACH preamble, the RO occasion, the timestamp, the indication that the DU2 410-*b* ordered the transmission of the RACH message, or a combination thereof. The CU 405 may transmit a TA message to the DU2 410-*b* in accordance with the determination. In some examples, the TA message may include the TA information and exclude other information. In some examples, the TA message transmitted to the DU2 410-*b* by the CU 405 may indicate the ID of the first cell, the RACH preamble, the RO occasion, the timestamp, or a combination thereof.

At 475, the DU2 410-*b* may indicate the TA information to the UE 115-*h*. For example, the DU2 410-*b* may determine that the TA information corresponds to the UE 115-*h* based on the TA message. In some examples, the DU2 410-*b* may transmit, to the UE 115-*h*, a RAR corresponding to the RACH message that indicates the TA information.

At 480, the UE 115-*h* may transmit a lower-layer measurement report to the DU2 410-*b*. For example, the UE 115-*h* may perform L1 measurements on the one or more configured candidate target cells, including the first cell. The UE 115-*h* may transmit a lower-layer measurement report to the DU2 410-*b* that indicates the L1 measurements performed by the UE 115-*h*.

At 485, the DU2 410-*b* may transmit a cell switch indication to the UE 115-*h* to switch to the first cell. For example, the DU2 410-*b* may decide to execute LTM cell switch to the first cell and may transmit a MAC CE triggering an LTM cell switch, such as by including a candidate configuration index of the first cell. In response, the UE 115-*h* may switch to the first cell. In some examples, the cell switch indication may include the TA information. For examples, the DU2 410-*b* may indicate the TA information associated with the RACH message via the cell switch indication such that the UE 115-*h* may perform a RACH-less switch to the first cell in accordance with the TA information.

At 490, the UE 115-*h* may perform a mobility completion procedure. For example, the UE 115-*h* may indicate a successful completion of the LTM cell switch towards the target cell (e.g., the first cell).

Figure 5:
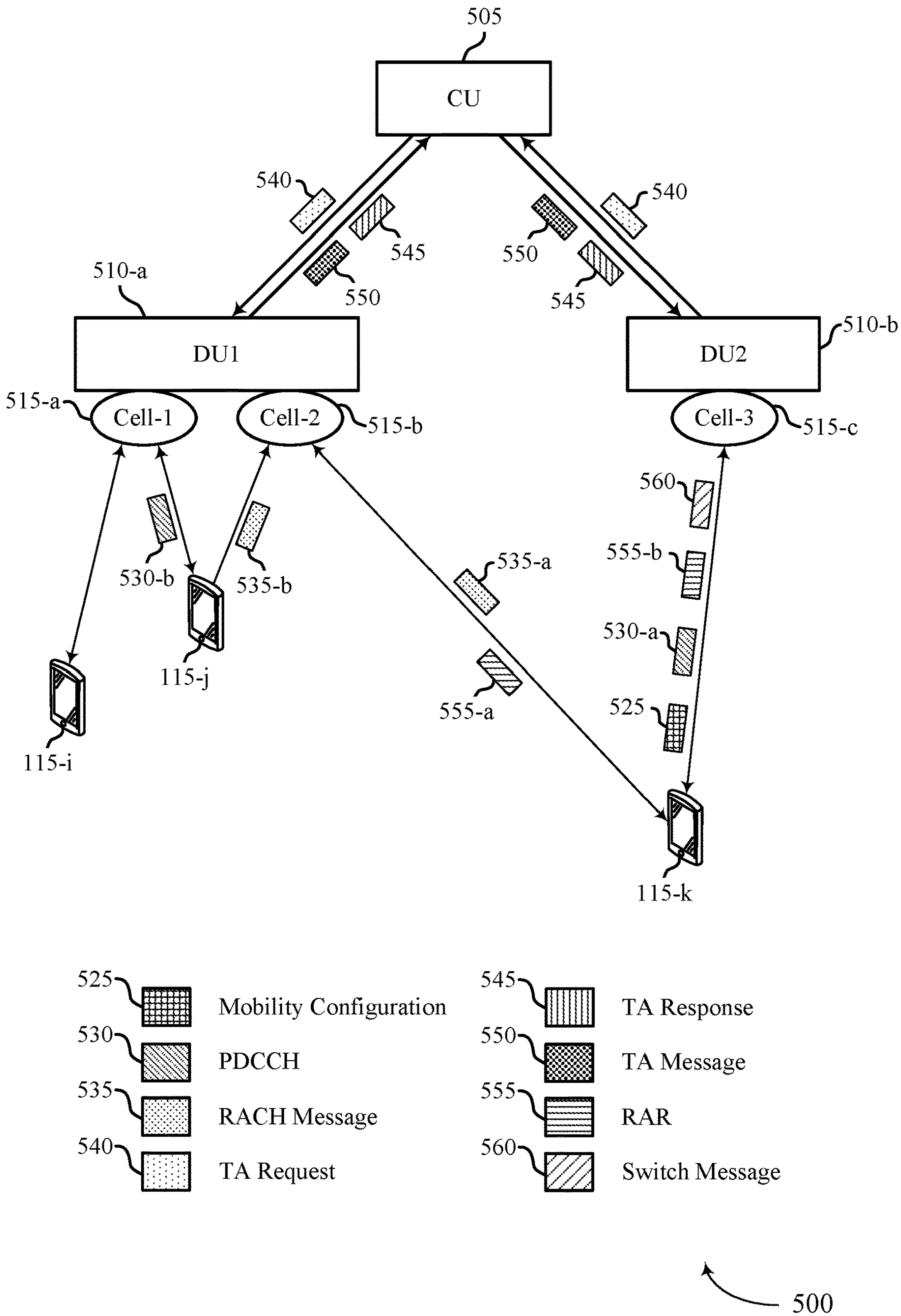
FIG. 5 shows an example of a wireless communications system that supports TA acquisition in LTM in accordance with one or more aspects of the present disclosure.

FIG. 5 shows an example of a wireless communications system 500 that supports TA acquisition in LTM in accordance with one or more aspects of the present disclosure. The wireless communications system 500 may implement or be implemented by aspects of the wireless communications system 100 or the network architecture 200, as described with reference to FIGS. 1 and 2, respectively. For example, the wireless communications system 500 may include a CU 505, one or more DUs 310, and one or more UEs 115, which may be examples of corresponding devices as described with reference to FIGS. 1 and 2. In the example of FIG. 5, the CU 505 and one or more DUs 510 may support the identification of a UE 115 to which TA information corresponds at a candidate target cell of the UE 115 (e.g., by a DU that measures the TA information).

In the example of FIG. 5, the wireless communications system 500 may include the CU 505, a DU1 510-*a*, and a DU2 510-*b*. The DU1 510-*a* may support (e.g., serve) one or more cells 515, including a cell-1 515-*a* and a cell-2 515-*b* in the example of FIG. 5. The DU1 510-*a* may also serve one or more UEs 115 via the one or more cells 515, such as a UE 115-*i* and a UE 115-*j* via the cell-1 515-*a*. The DU2 may support one or more cells 515, such as a cell-3 515-*c* in the example of FIG. 5. The DU2 510-*b* may also serve one or more UEs 115 via the one or more cells 515, such as a UE 115-*k* via the cell-3 515-*c*. The CU 505 may manage the DU1 510-*a* and the DU2 510-*b* and communicate with the DUs 510 via respective midhaul communication links.

As described with reference to FIG. 3, the wireless communications system 500 may support lower layer supported mobility (e.g., handover, cell switching), such as LTM. The wireless communications system 300 may support various techniques to support UE identification in association with early TA information acquisition at a candidate target cell.

For instance, in the example of FIG. 5, the UEs 115 may be configured with the cell-2 515-*b* as a candidate target cell. In a first example, identification of which UE 115 has been ordered to transmit a RACH message 535 to obtain TA information may accomplished via the use of UE-specific RACH preambles. For example, the UEs 115 may be configured with (e.g., via RRC signaling) distinct dedicated RACH preambles such that transmission of a RACH message 535 indicating a given RACH preamble may identify the UE 115 that transmits the RACH message 535. For instance, the DU2 510-*b* may transmit a mobility configuration 525 to the UE 115-*k* that indicates (e.g., allocates) a dedicated RACH preamble (e.g., a RACH preamble ID) for the UE 115-*k* to use to transmit a RACH message 535-*a*. Accordingly, in response to a PDCCH 530-*a* transmitted by the DU2 510-*b* that orders the UE 115-*k* to transmit the RACH message 535-*a*, the UE 115-*k* may transmit the RACH message 535-*a* indicating the dedicated RACH preamble to the cell-2 515-*b*. As such, the identity of the UE 115-*k* that transmitted the RACH message 535-*a* may be determined (e.g., inferred) by the DU1 510-*a* from an ID of the RACH preamble.

The UEs 115 served by the cell-1 515-*a* may similarly be configured with (e.g. allocated) respective dedicated RACH preambles. For example, the UE 115-*j* may transmit, to the cell-2 515-*b*, a RACH message 535-*b* indicating (e.g., using, including, corresponding to) a dedicated RACH preamble allocated to the UE 115-*j* in response to a PDCCH 530-*b* transmitted by the DU1 510-*a* via the cell-1 515-*a*.

In some examples, the mobility configuration 525 may be transmitted via an RRC message, such as an RRC message that configures the cell-2 515-*b* as a candidate target cell, or another RRC message.

In a second example, the UE 115 that transmits a RACH message 535 may be uniquely identified by a RACH preamble, RO pair. For example, early TA acquisition may be contention-free. That is, transmission of the RACH messages 535 may be contention-free. As such, UEs 115 configured with the same RACH preamble indices for transmission of a RACH message 535 may also be configured with different ROs to avoid contention. Accordingly, even if a same RACH preamble is used to transmit a given RACH message 535, a unique RACH preamble ID, RO pair may identify a given UE 115.

Thus, the mobility configuration 525 may include a configuration of one or more RACH preambles (e.g., RACH preamble IDs) allocated to a respective UE 115 (e.g., the UE 115-*k*) and a configuration of one or more ROs via which the UE 115 is to transmit a RACH message 535.

Additionally, UEs 115 that support LTM may move within and across candidate target cells with no reconfiguration via RRC (e.g., L3 mobility). For example, if the UE 115-*k* switches to communicate via the cell-2 515-*b*, the UE 115-*k* may not necessarily receive a new RRC configuration. Instead, LTM enables UEs 115 to switch between serving cells 515 without RRC reconfiguration. As such, to support switching to the cell-2 515-*b* (e.g., at various times), a UE 115 may be configured with a list of ROs (e.g., via the mobility configuration 525) corresponding to all of the SSB beams associated with cell-2 515-*b* that the UE 115 may observe as the UE 115 moves within its serving cell 515 or across candidate target cells 515. As a result, UEs 115 assigned a same RACH preamble ID may observe different SSB beams at different points in time and thus may use different ROs to transmit RACH messages 535. Accordingly, the list of ROs configured for each UE 115 for all potential SSB beams that may be observed by each UE 115 may be unique in order to support (e.g., ensure) unique RACH preamble ID, RO pairs. In this way, the DU1 510-*a* may identify which UE 115 transmitted a given RACH message 535 based on the unique RACH preamble ID, RO pair.

In a third example, the UE 115 that transmits a RACH message 535 may be identified by ensuring that, for a given RACH preamble ID (e.g., and/or a given RO), at most one UE 115 sends a RACH message 535 corresponding to the RACH preamble ID (e.g., and/or RO) at a time. For example, since sending PRACH (e.g., RACH messages 535) for early TA information acquisition is based on PDCCH order, at most one UE 115 may be ensured to send a PRACH for a given RACH preamble ID at a time, which may enable the UE 115 to be identified.

For example, for an intra-DU case in which a DU 510 orders a UE 115 to transmit a RACH message 535 to the DU 510 via a candidate target cell served by the DU 510, the DU 510 may determine the UE 115 that transmitted the RACH message 535 based on when the RACH message 535 is received. For instance, the DU1 510-*a* may order (e.g., via a PDCCH 530) the UE 115-*j* to transmit a first RACH message 535 indicating a particular RACH preamble to the cell-2 515-*b*. The DU1 510-*a* may then receive the first RACH message 535 and determine that the UE 115-*j* transmitted the first RACH message 535 (e.g., and thus that the TA information corresponds to the UE 115-*j*) based on having ordered the UE 115-*j* to transmit the first RACH message 535 indicating the RACH preamble. The DU1 510-*a* may then order the UE 115-*i* to transmit a second RACH message 535 indicating the particular RACH preamble to the cell-2 515-*b* and similarly determine that the UE 115-*i* transmitted the second RACH message 535. That is, the DU1 510-*a* may ensure that at most one of the UE 115-*j* and the UE 115-*i* transmit a RACH message 535 indicating a given RACH preamble and may thus determine which UE 115 transmitted the RACH message 535 and to which UE 115 the TA information corresponds.

In some examples, for the intra-DU case, the DU1 510-*a* may ensure that at most one of the UE 115-*j* and the UE 115-*i* transmit a RACH message 535 via a given RO and may similarly determine which UE 115 transmitted the RACH message 535 and to which UE 115 TA information associated the RACH message 535 corresponds. In some cases, latency may be one the order of one or few SSB periods (e.g., for the case that PRACH is not transmitted on the very next RACH occasion, or not successfully received by cell2 515-*b* after the first transmission). In some examples, DU1 510-*a* may further be enhanced if the DU1 510-*a* knows that UE 115-*j* and UE 115-*i* may use different RACH occasions based on layer 1 (L1) reports received from each of these UEs.

In an inter-DU case, for example, in which the DU2 510-*b* orders the UE 115-*k* to transmit a RACH message 535 to the cell-2 515-*b*, the DU2 510-*b* may ensure that at most the UE 115-*k* transmits the RACH message 535 indicating a given RACH preamble at a given time by asking the DU1 510-*a* for permission. For example, the DU2 510-*b* may first ask the DU1 510-*a* for permission to order the UE 115-*k* to transmit the RACH message 535 to (e.g., via) the cell-2 515-*b*. Because the DU2 510-*b* and the DU1 510-*a* do not have a direct interface, the DU2 510-*b* may ask for the permission by talking the CU 505, which then talks to the DU1 510-*a*, which then responds to the CU 505, which then responds to the DU2 510-*b*. That is, the DU2 510-*b* may ask the DU1 510-*a* for the permission via the CU 505.

For example, the DU2 510-*b* may transmit a TA request 540 to the CU 505 that is intended for the DU1 510-*a*. For instance, the TA request 540 may request that the DU1 510-*a* allow (e.g., permit, enable) the DU2 510-*b* to order the UE 115-*k* to transmit the RACH message 535 to the cell-2 515-*b*. The TA request 540 may include an ID associated with the UE 115-*k* (e.g., at the DU2 510-*b* and/or the DU1 510-*a*), a source cell ID (e.g., an ID of the cell-3 515-*c*), a candidate target cell ID (e.g. an ID of the cell-2 515-*b*), an ID of the DU1 510-*a*, and ID of the DU2 510-*b*, an ID of the RACH preamble to be indicated by the RACH message 535, a RACH resource (e.g., an RO via which to transmit the RACH message 535), a time of PDCCH order (e.g., a time at which the DU2 510-*b* is to transmit a PDCCH 530 to order the UE 115-*k* to transmit the RACH message 535), a time of PRACH reception (e.g., a time at which the DU1 510-*a* is to receive to RACH message 535), or a combination thereof.

The CU 505 may receive the TA request 540 and forward (e.g., transmit) the TA request 540 to the DU1 510-*a*. If no other UE 115 will be ordered to send a RACH message 535 indicating the same RACH preamble as the one requested in the TA request 540, the DU1 510-*a* may approve the request. Otherwise, the request may be rejected (e.g., denied). The DU1 510-*a* may transmit a TA response 545 to the CU 505 that indicates whether the TA request 540 is approved (e.g., confirmed) or rejected. For example, the TA response 545 may indicate whether the DU2 510-*b* is permitted to order the UE 115-*k* to transmit the RACH message 535. The CU 505 may receive the TA response 545 and forward the TA response to the DU2 510-*b*.

If the TA request 540 is approved, the DU2 510-*b* may transmit a PDCCH 530 (e.g., the PDCCH 530-*a*) indicating (e.g., ordering) the UE 115-*k* to transmit the RACH message 535 (e.g., the RACH message 535-*a*) in accordance with the TA request 540. Because the RACH message 535 is transmitted in accordance with the TA request 540, the parameters of which are known to the DU1 510-*a*, the DU1 510-*a* may identify the UE 115-*k* as the UE 115 that transmitted the RACH message 535 and to which TA information associated with the RACH message 535 corresponds.

In some examples of the inter-DU case, the DU2 510-*b* may perform a one-way handshake to indicate that the DU2 510-*b* will order the UE 115-*k* to transmit the RACH message 535. For instance, the DU2 510-*b* may notify the CU 505 that it will order the UE 115-*k* to transmit the RACH message 535 to the cell-2 515-*b*. For example, the TA request 540 may inform (e.g., notify, indicate) the CU 505 (e.g., rather than asking for permission) that the DU2 510-*b* will order the UE 115-*k* to transmit the RACH message 535 in accordance with the information included in the TA request 540 as described above (e.g., IDs of the UE 115-*k*, cell-2 515-*b*, DU2 510-*b*, RACH preamble, the RACH resource, the time of PDCCH order, the time of PRACH reception, or a combination thereof). The CU 505 may forward the notification (e.g., the TA request 540) to the DU1 510-*a* such that the DU1 510-*a* may receive the RACH message 535 and identify the UE 115-*k* as the UE 115 that transmitted the RACH message 535 and to which TA information associated with the RACH message 535 corresponds. Here, based on the TA request 540 being a notification rather than a request, the DU1 510-*a* may not transmit the TA response 545 in response to the TA request 540.

In some examples, the DU1 510-*a* may indicate the TA information to the UE 115-*k* via a RAR 555-*a*. For example, the DU1 510-*a* may transmit the RAR 555-*a* in response to the RACH message 535-*a* that indicates the TA information. In some examples, the DU1 510-*a* may indicate the TA information to the UE 115-*k* indirectly via the DU2 510-*b*. For example, the DU1 510-*a* may transmit a TA message 550 to the DU2 510-*b* via the CU 505 (e.g., the CU 505 may receive the TA message 550 from the DU1 510-*a* and transmit the TA message 550 to the DU2 510-*b*). In some examples, the DU2 510-*b* may indicate the TA information to the UE 115-*k* via a RAR 555-*b* or via a switch message 560 (e.g., a cell switch indication) indicating for the UE 115-*k* to switch to the cell-2 515-*b*.

In some examples of the inter-DU case, the DU1 510-*a*, the CU 505, and the DU2 510-*b* may exchange (e.g., communicate) the TA request 540, the TA response 545, the TA message 550, or a combination thereof via UE associated signaling, such as F1 signaling that is UE-associated (e.g., the F1 signaling does specify that the message is associated with a particular UE 115, such as the UE 115-*k*). For example, an F1 AP message that includes (e.g., carries) the TA request 540, the TA response 545, or the TA message 550 may include an AP specific UE ID (e.g., or pair of UE IDs) associated with the particular UE 115 (e.g., the UE 115-*k*).

Figure 6:
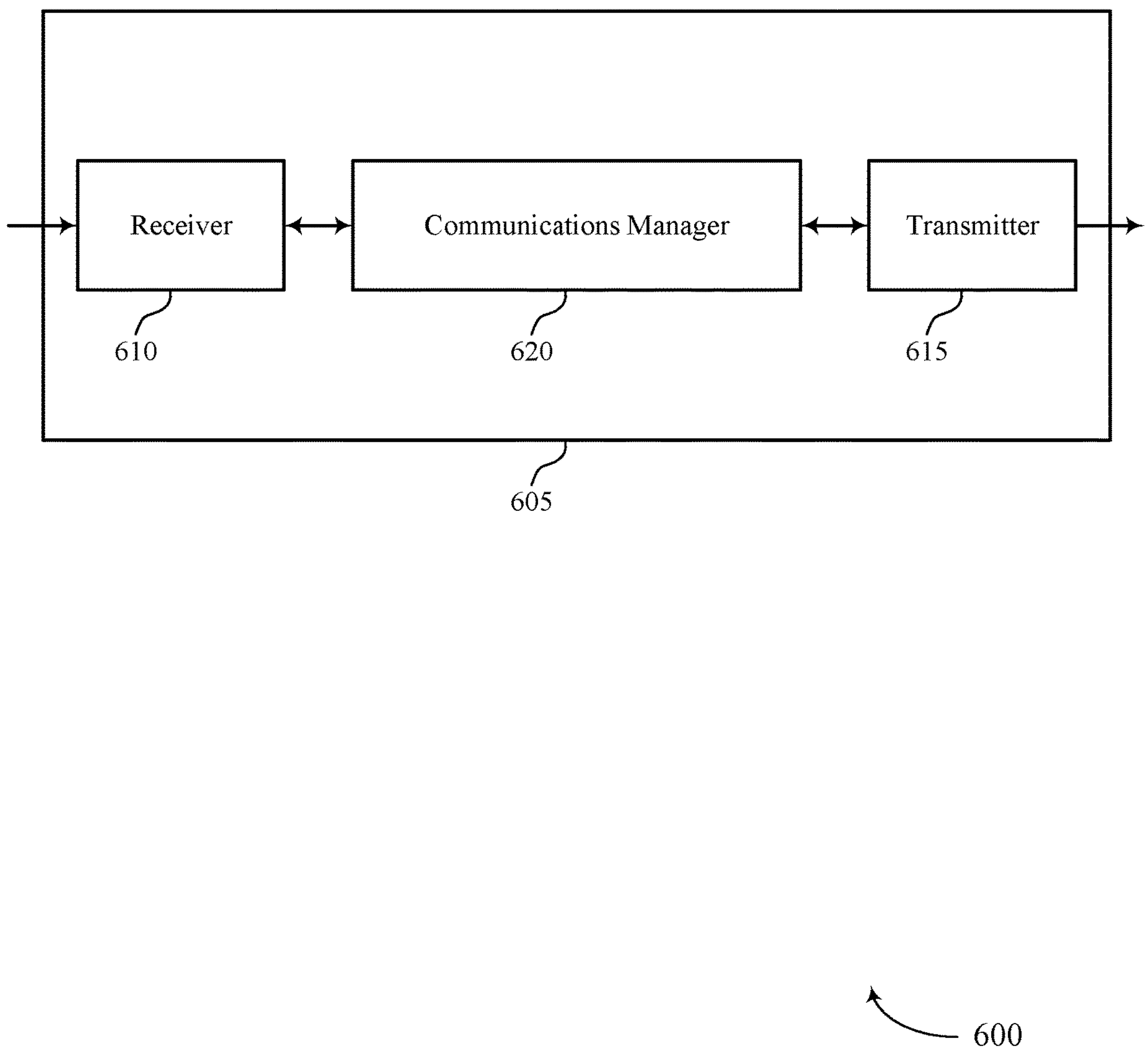
FIGS. 6 and 7 show block diagrams of devices that support TA acquisition in LTM in accordance with one or more aspects of the present disclosure.

FIG. 6 shows a block diagram 600 of a device 605 that supports TA acquisition in LTM in accordance with one or more aspects of the present disclosure. The device 605 may be an example of aspects of a network entity 105 (e.g., a DU, a CU), as described herein. The device 605 may include a receiver 610, a transmitter 615, and a communications manager 620. The device 605 may also include a processor. Each of these components may be in communication with one another (e.g., via one or more buses).

The receiver 610 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 605. In some examples, the receiver 610 may support obtaining information by receiving signals via one or more antennas. Additionally, or alternatively, the receiver 610 may support obtaining information by receiving signals via one or more wired (e.g., electrical, fiber optic) interfaces, wireless interfaces, or any combination thereof.

The transmitter 615 may provide a means for outputting (e.g., transmitting, providing, conveying, sending) information generated by other components of the device 605. For example, the transmitter 615 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 615 may support outputting information by transmitting signals via one or more antennas. Additionally, or alternatively, the transmitter 615 may support outputting information by transmitting signals via one or more wired (e.g., electrical, fiber optic) interfaces, wireless interfaces, or any combination thereof. In some examples, the transmitter 615 and the receiver 610 may be co-located in a transceiver, which may include or be coupled with a modem.

The communications manager 620, the receiver 610, the transmitter 615, or various combinations thereof or various components thereof may be examples of means for performing various aspects of TA acquisition in LTM as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a DU (e.g., a DU1) associated with a first cell in accordance with examples as disclosed herein. For example, the communications manager 620 is capable of, configured to, or operable to support a means for transmitting, to a CU associated with the DU, a first indication of a set of RACH preambles for TA information acquisition in association with a triggered cell switch to the first cell. The communications manager 620 is capable of, configured to, or operable to support a means for receiving, from a UE associated with a second cell, a RACH message indicating a RACH preamble of the set of RACH preambles. The communications manager 620 is capable of, configured to, or operable to support a means for transmitting, to the CU, a second indication of TA information associated with the RACH message.

Additionally, or alternatively, the communications manager 620 may support wireless communications at a CU in accordance with examples as disclosed herein. For example, the communications manager 620 is capable of, configured to, or operable to support a means for receiving, from a first DU (e.g., a DU1) associated with the CU, a first indication of a set of RACH preambles for TA information acquisition in association with a triggered cell switch to a first cell associated with the first DU. The communications manager 620 is capable of, configured to, or operable to support a means for transmitting, to a second DU (e.g., a DU2) associated with the CU, a second indication of one or more RACH preambles of the set of RACH preambles allocated to the second DU for the TA information acquisition. The communications manager 620 is capable of, configured to, or operable to support a means for receiving, from the first DU, a third indication of TA information associated with a RACH message indicating a RACH preamble of the one or more RACH preambles. The communications manager 620 is capable of, configured to, or operable to support a means for transmitting, to the second DU, a fourth indication of the TA information.

Additionally, or alternatively, the communications manager 620 may support wireless communications at a second DU (e.g., a DU2) associated with a second cell in accordance with examples as disclosed herein. For example, the communications manager 620 is capable of, configured to, or operable to support a means for receiving, from a CU associated with the second DU, a first indication of a set of RACH preambles for TA information acquisition in association with a triggered cell switch to a first cell associated with a first DU (e.g., a DU1). The communications manager 620 is capable of, configured to, or operable to support a means for transmitting, to a UE associated with the first cell, a second indication to transmit, to the first cell, a RACH message indicating a RACH preamble of the set of RACH preambles. The communications manager 620 is capable of, configured to, or operable to support a means for receiving, from the CU, a third indication of TA information associated with the RACH message. The communications manager 620 is capable of, configured to, or operable to support a means for transmitting, to the UE, a fourth of the TA information.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced processing, increased mobility with improved RACH preamble management, and more efficient utilization of communication resources.

Figure 7:
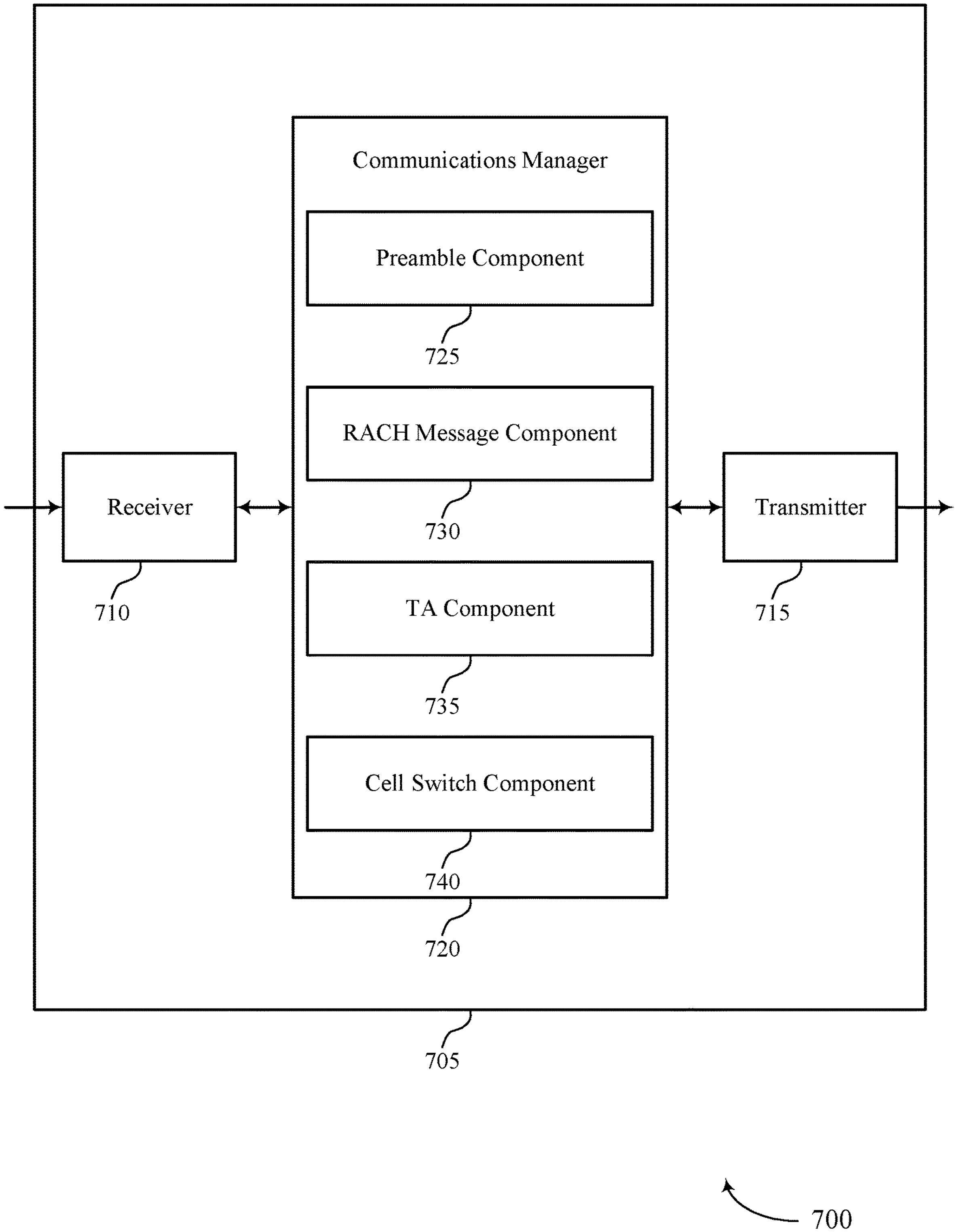

FIG. 7 shows a block diagram 700 of a device 705 that supports TA acquisition in LTM in accordance with one or more aspects of the present disclosure. The device 705 may be an example of aspects of a device 605 or a network entity 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 705. In some examples, the receiver 710 may support obtaining information by receiving signals via one or more antennas. Additionally, or alternatively, the receiver 710 may support obtaining information by receiving signals via one or more wired (e.g., electrical, fiber optic) interfaces, wireless interfaces, or any combination thereof.

The transmitter 715 may provide a means for outputting (e.g., transmitting, providing, conveying, sending) information generated by other components of the device 705. For example, the transmitter 715 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 715 may support outputting information by transmitting signals via one or more antennas. Additionally, or alternatively, the transmitter 715 may support outputting information by transmitting signals via one or more wired (e.g., electrical, fiber optic) interfaces, wireless interfaces, or any combination thereof. In some examples, the transmitter 715 and the receiver 710 may be co-located in a transceiver, which may include or be coupled with a modem.

The device 705, or various components thereof, may be an example of means for performing various aspects of TA acquisition in LTM as described herein. For example, the communications manager 720 may include a preamble component 725, a RACH message component 730, a TA component 735, a cell switch component 740, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a DU (e.g., a DU1) associated with a first cell in accordance with examples as disclosed herein. The preamble component 725 is capable of, configured to, or operable to support a means for transmitting, to a CU associated with the DU, a first indication of a set of RACH preambles for TA information acquisition in association with a triggered cell switch to the first cell. The RACH message component 730 is capable of, configured to, or operable to support a means for receiving, from a UE associated with a second cell, a RACH message indicating a RACH preamble of the set of RACH preambles. The TA component 735 is capable of, configured to, or operable to support a means for transmitting, to the CU, a second indication of TA information associated with the RACH message.

Additionally, or alternatively, the communications manager 720 may support wireless communications at a CU in accordance with examples as disclosed herein. The preamble component 725 is capable of, configured to, or operable to support a means for receiving, from a first DU (e.g., a DU1) associated with the CU, a first indication of a set of RACH preambles for TA information acquisition in association with a triggered cell switch to a first cell associated with the first DU. The preamble component 725 is capable of, configured to, or operable to support a means for transmitting, to a second DU (e.g., a DU2) associated with the CU, a second indication of one or more RACH preambles of the set of RACH preambles allocated to the second DU for the TA information acquisition. The TA component 735 is capable of, configured to, or operable to support a means for receiving, from the first DU, a third indication of TA information associated with a RACH message indicating a RACH preamble of the one or more RACH preambles. The TA component 735 is capable of, configured to, or operable to support a means for transmitting, to the second DU, a fourth indication of the TA information.

Additionally, or alternatively, the communications manager 720 may support wireless communications at a second DU (e.g., a DU2) associated with a second cell in accordance with examples as disclosed herein. The preamble component 725 is capable of, configured to, or operable to support a means for receiving, from a CU associated with the second DU, a first indication of a set of RACH preambles for TA information acquisition in association with a triggered cell switch to a first cell associated with a first DU (e.g., a DU1). The RACH message component 730 is capable of, configured to, or operable to support a means for transmitting, to a UE associated with the first cell, a second indication to transmit, to the first cell, a RACH message indicating a RACH preamble of the set of RACH preambles. The TA component 735 is capable of, configured to, or operable to support a means for receiving, from the CU, a third indication of TA information associated with the RACH message. The cell switch component 740 is capable of, configured to, or operable to support a means for transmitting, to the UE, a fourth indication of the TA information.

Figure 8:
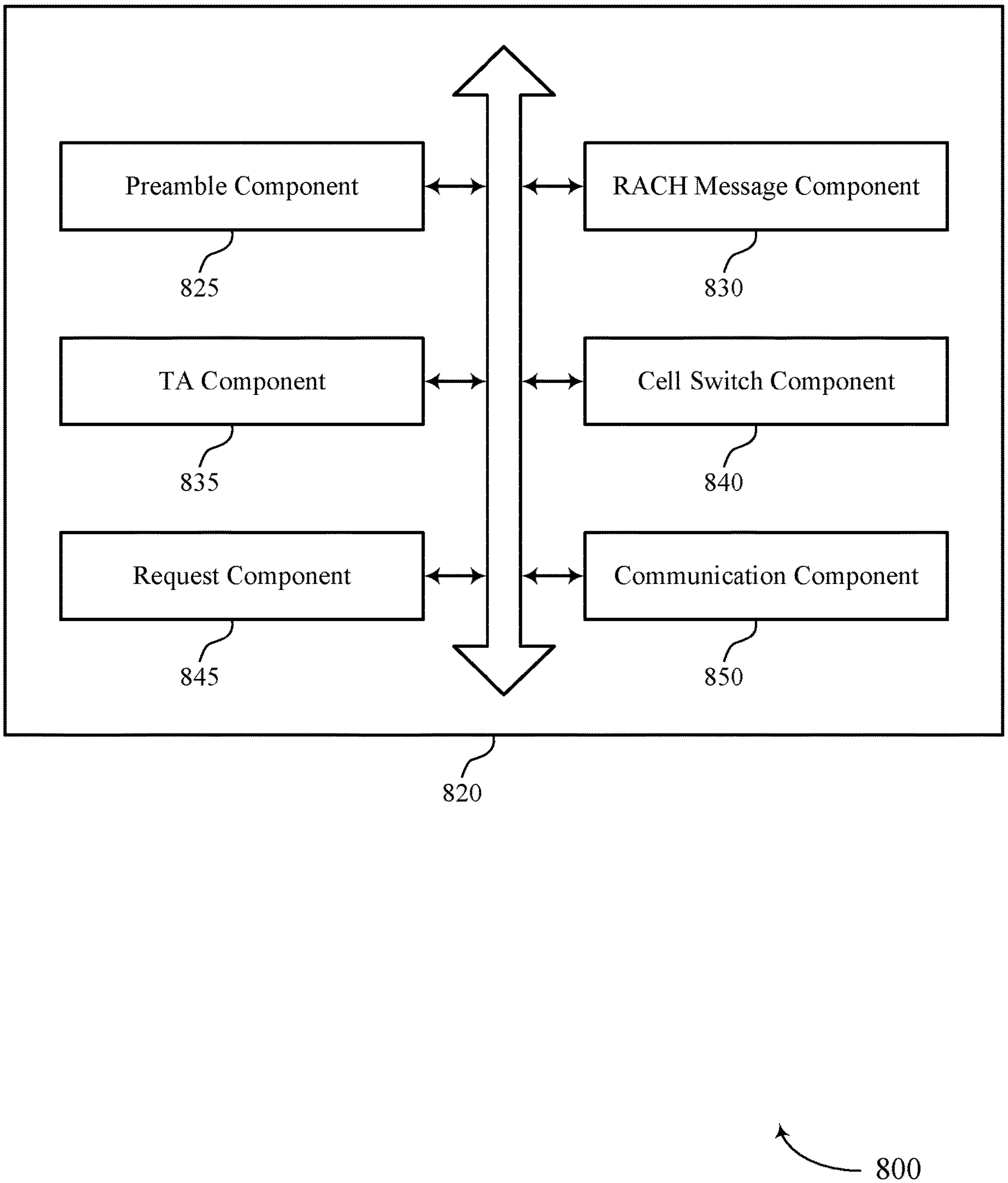
FIG. 8 shows a block diagram of a communications manager that supports TA acquisition in LTM in accordance with one or more aspects of the present disclosure.

FIG. 8 shows a block diagram 800 of a communications manager 820 that supports TA acquisition in LTM in accordance with one or more aspects of the present disclosure. The communications manager 820 may be an example of aspects of a communications manager 620, a communications manager 720, or both, as described herein. The communications manager 820, or various components thereof, may be an example of means for performing various aspects of TA acquisition in LTM as described herein. For example, the communications manager 820 may include a preamble component 825, a RACH message component 830, a TA component 835, a cell switch component 840, a request component 845, a communication component 850, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 820 may support wireless communications at a DU (e.g., a DU1) associated with a first cell in accordance with examples as disclosed herein. The preamble component 825 is capable of, configured to, or operable to support a means for transmitting, to a CU associated with the DU, a first indication of a set of RACH preambles for TA information acquisition in association with a triggered cell switch to the first cell. The RACH message component 830 is capable of, configured to, or operable to support a means for receiving, from a UE associated with a second cell, a RACH message indicating a RACH preamble of the set of RACH preambles. The TA component 835 is capable of, configured to, or operable to support a means for transmitting, to the CU, a second indication of TA information associated with the RACH message.

In some examples, the request component 845 is capable of, configured to, or operable to support a means for receiving, from the CU, a request for the first DU to allocate the set of RACH preambles for the TA information acquisition, where the request includes an ID of a second distributed unit, and where the first indication is transmitted in response to the request.

In some examples, the second indication indicates an ID of the first cell, an ID associated with the RACH preamble, or a combination thereof.

In some examples, the second indication indicates the RACH preamble, an RO via which the RACH message is received, a timestamp of reception of the RACH message, an indication of the second DU, or a combination thereof.

In some examples, the preamble component 825 is capable of, configured to, or operable to support a means for receiving, from the CU, a third indication of respective allocations of one or more RACH preambles of the set of RACH preambles to respective DUs of a set of DUs associated with the CU, where the second indication indicates a second DU (e.g., a DU2) of the set of DUs and associated with the second cell based on the RACH preamble being included in a respective allocation of one or more RACH preambles to the second DU.

In some examples, the communication component 850 is capable of, configured to, or operable to support a means for communicating with the UE based on a cell switch of the UE to the first cell in accordance with the TA information.

In some examples, the preamble component 825 is capable of, configured to, or operable to support a means for allocating a second set of RACH preambles for the TA information acquisition, the second set of RACH preambles associated with a cell switch from a third cell associated with the DU to the first cell. In some examples, the RACH message component 830 is capable of, configured to, or operable to support a means for transmitting, to a second UE associated with the third cell, a third indication to transmit, to the first cell, a second RACH message indicating a second RACH preamble of the second set of RACH preambles. In some examples, the RACH message component 830 is capable of, configured to, or operable to support a means for receiving, from the second UE and based on the third indication, the second RACH message indicating the second RACH preamble, where the second UE is identified by the DU based on the second RACH preamble.

In some examples, the second set of RACH preambles are excluded from the set of RACH preambles based on being associated with the cell switch from the third cell.

In some examples, to support transmitting the second indication, the TA component 835 is capable of, configured to, or operable to support a means for transmitting the second indication via non-UE associated signaling.

In some examples, the triggered cell switch to the first cell is an L1 triggered cell switch or L2 triggered cell switch.

Additionally, or alternatively, the communications manager 820 may support wireless communications at a CU in accordance with examples as disclosed herein. In some examples, the preamble component 825 is capable of, configured to, or operable to support a means for receiving, from a first DU (e.g., a DU1) associated with the CU, a first indication of a set of RACH preambles for TA information acquisition in association with a triggered cell switch to a first cell associated with the first DU. In some examples, the preamble component 825 is capable of, configured to, or operable to support a means for transmitting, to a second DU (e.g., a DU2) associated with the CU, a second indication of one or more RACH preambles of the set of RACH preambles allocated to the second DU for the TA information acquisition. In some examples, the TA component 835 is capable of, configured to, or operable to support a means for receiving, from the first DU, a third indication of TA information associated with a RACH message indicating a RACH preamble of the one or more RACH preambles. In some examples, the TA component 835 is capable of, configured to, or operable to support a means for transmitting, to the second DU, a fourth indication of the TA information.

In some examples, the request component 845 is capable of, configured to, or operable to support a means for transmitting, to the first DU, a request for the first DU to allocate the set of RACH preambles for the TA information acquisition, where the request includes an ID for the second distributed unit, and where the first indication is received in response to the request.

In some examples, to support transmitting the fourth indication, the TA component 835 is capable of, configured to, or operable to support a means for transmitting the fourth indication to the second DU based on the third indication indicating the RACH preamble and the RACH preamble being included in the one or more RACH preambles allocated to the second DU.

In some examples, the preamble component 825 is capable of, configured to, or operable to support a means for transmitting, to the first DU, a fifth indication of the allocation of the one or more RACH preambles to the second DU, where the third indication indicates the second DU based on the fifth indication and the RACH preamble being included in the one or more RACH preambles allocated to the second DU.

In some examples, to support transmitting the fourth indication, the TA component 835 is capable of, configured to, or operable to support a means for transmitting the fourth indication to the second DU based on the third indication indicating the second DU.

In some examples, the third indication indicates an ID of the first cell, an ID associated with the RACH preamble, an RO via which the RACH message is received at the first DU, a timestamp of a reception of the RACH message at the first DU, or a combination thereof. In some examples, the fourth indication indicates the ID of the first cell, the ID associated with the RACH preamble, the RO, the timestamp of the reception of the RACH message at the first DU, or a combination thereof.

In some examples, to support transmitting the fourth indication, the TA component 835 is capable of, configured to, or operable to support a means for transmitting the fourth indication to the second DU based on the third indication indicating an ID associated with the RACH preamble and an RO via which the RACH message is received at the first DU, where a combination of the ID and the RO indicates the second DU as having ordered a transmission of the RACH message.

In some examples, the second indication indicates one or more ROs including the RO that are allocated to the second DU. In some examples, the combination of the ID and the RO indicates the second DU based on each of the RACH preamble and the RO being allocated to the second DU.

In some examples, to support transmitting the second indication, the preamble component 825 is capable of, configured to, or operable to support a means for transmitting the second indication to a set of DUs including the second DU, the second indication allocating the one or more RACH preambles to each DU of the set of DUs. In some examples, to support transmitting the fourth indication, the TA component 835 is capable of, configured to, or operable to support a means for transmitting the fourth indication to the set of DUs based on the one or more RACH preambles being allocated to each DU of the set of DUs.

In some examples, the request component 845 is capable of, configured to, or operable to support a means for receiving, from the second DU, a request to be allocated RACH preambles for the TA information acquisition, where the second indication is transmitted in response to the request.

In some examples, to support transmitting the fourth indication, the TA component 835 is capable of, configured to, or operable to support transmitting the fourth indication via non-UE associated signaling.

In some examples, to support receiving the third indication, the TA component 835 is capable of, configured to, or operable to support receiving the third indication via non-UE associated signaling.

In some examples, the triggered cell switch to the first cell is an L1 triggered cell switch or L2 triggered cell switch.

In some examples, the one or more RACH preambles are allocated to a second cell associated with the second DU or to a group of cells comprising the second cell.

Additionally, or alternatively, the communications manager 820 may support wireless communications at a second DU (e.g., a DU2) associated with a second cell in accordance with examples as disclosed herein. In some examples, the preamble component 825 is capable of, configured to, or operable to support a means for receiving, from a CU associated with the second DU, a first indication of a set of RACH preambles for TA information acquisition in association with a triggered cell switch to a first cell associated with a first DU (e.g., a DU1). In some examples, the RACH message component 830 is capable of, configured to, or operable to support a means for transmitting, to a UE associated with the first cell, a second indication to transmit, to the first cell, a RACH message indicating a RACH preamble of the set of RACH preambles. In some examples, the TA component 835 is capable of, configured to, or operable to support a means for receiving, from the CU, a third indication of TA information associated with the RACH message. The cell switch component 840 is capable of, configured to, or operable to support a means for transmitting, to the UE, a fourth indication of the TA information.

In some examples, to support transmitting the fourth indication, the cell switch component 840 is capable of, configured to, or operable to support a means for transmitting the fourth indication via a RAR or via a cell switch indication for the UE to switch to the second cell.

In some examples, the request component 845 is capable of, configured to, or operable to support a means for transmitting, to the CU, a request to be allocated the set of RACH preambles for the TA information acquisition, where the first indication is received in response to the request.

In some examples, the TA component 835 is capable of, configured to, or operable to support a means for determining that the TA information is associated with the RACH message transmitted by the UE based on transmitting the second indication.

In some examples, the third indication indicates an ID of the first cell, an ID associated with the RACH preamble, an RO via which the RACH message is received at the first DU, a timestamp of a reception of the RACH message at the first DU, or a combination thereof.

In some examples, the TA component 835 is capable of, configured to, or operable to support a means for determining that the TA information is associated with the RACH message transmitted by the UE based on the ID of the first cell, the ID associated with the RACH preamble, the RO, the timestamp, or a combination thereof.

In some examples, the first indication indicates one or more ROs that are allocated to the second DU. In some examples, the second indication indicates an RO of the one or more ROs for the UE to use to transmit the RACH message.

In some examples, the TA component 835 is capable of, configured to, or operable to support a means for receiving, from the CU, a fifth indication of second TA information associated with a second RACH message, a second RACH preamble of the set of RACH preambles and associated with the second RACH message, and a second RO via which the second RACH message is communicated. In some examples, the TA component 835 is capable of, configured to, or operable to support a means for ignoring the second TA information based on the second RO being excluded from the one or more ROs allocated to the second DU.

In some examples, to support receiving the third indication, the TA component 835 is capable of, configured to, or operable to support a means for receiving the third indication via non-UE associated signaling.

In some examples, the triggered cell switch to the first cell is an L1 triggered cell switch or L2 triggered cell switch.

In some examples, the set of RACH preambles are allocated to the second cell associated with the second DU or to a group of cells comprising the second cell.

Figure 9:
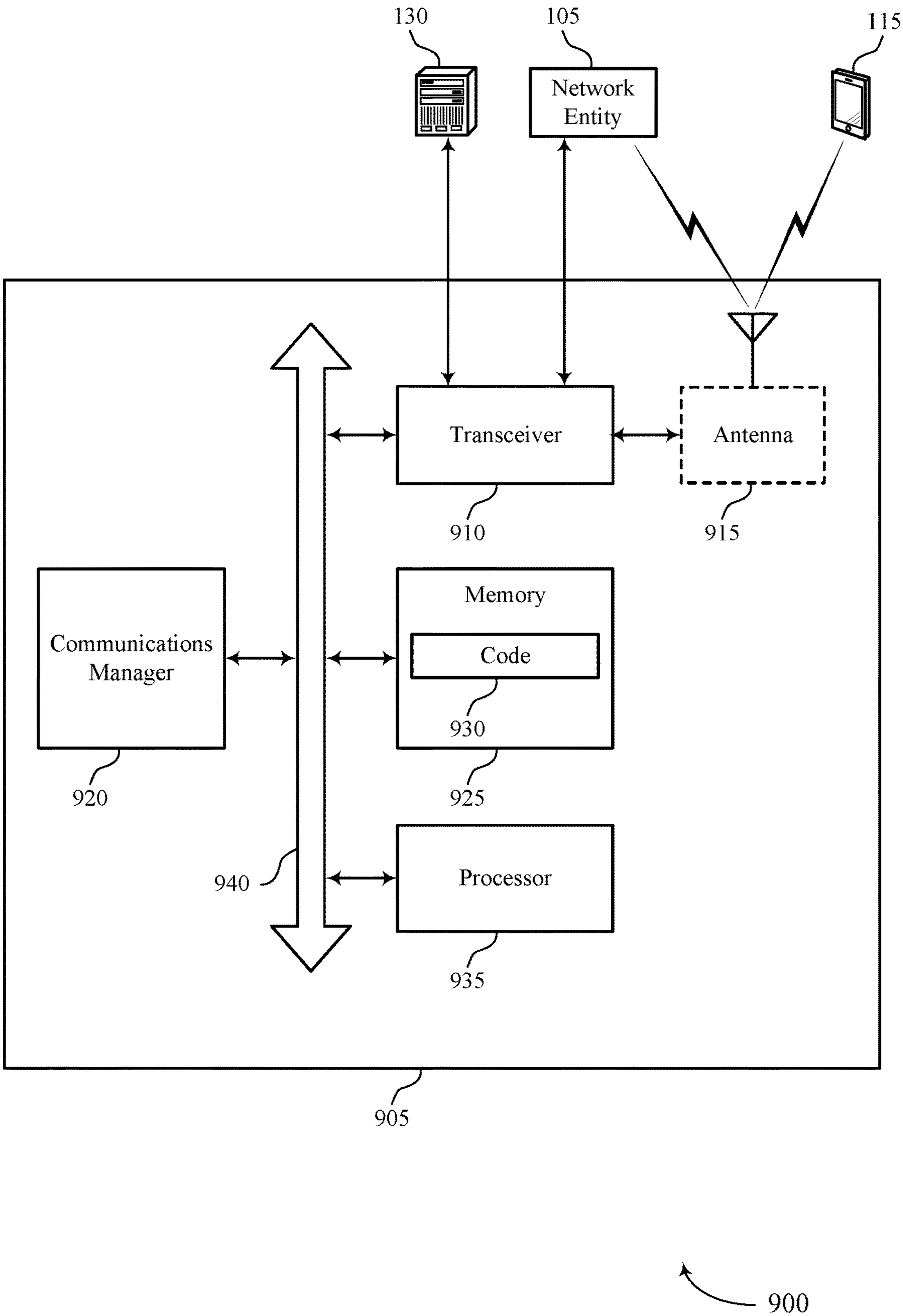
FIG. 9 shows a diagram of a system including a device that supports TA acquisition in LTM in accordance with one or more aspects of the present disclosure.

FIG. 9 shows a diagram of a system 900 including a device 905 that supports TA acquisition in LTM in accordance with one or more aspects of the present disclosure. The device 905 may be an example of or include the components of a device 605, a device 705, or a network entity 105 as described herein. The device 905 may communicate with one or more network entities 105, one or more UEs 115, or any combination thereof, which may include communications over one or more wired interfaces, over one or more wireless interfaces, or any combination thereof. The device 905 may include components that support outputting and obtaining communications, such as a communications manager 920, a transceiver 910, an antenna 915, a memory 925, code 930, and a processor 935. These components may be in electronic communication or otherwise coupled (e.g., operatively, communicatively, functionally, electronically, electrically) via one or more buses (e.g., a bus 940).

The transceiver 910 may support bi-directional communications via wired links, wireless links, or both as described herein. In some examples, the transceiver 910 may include a wired transceiver and may communicate bi-directionally with another wired transceiver. Additionally, or alternatively, in some examples, the transceiver 910 may include a wireless transceiver and may communicate bi-directionally with another wireless transceiver. In some examples, the device 905 may include one or more antennas 915, which may be capable of transmitting or receiving wireless transmissions (e.g., concurrently). The transceiver 910 may also include a modem to modulate signals, to provide the modulated signals for transmission (e.g., by one or more antennas 915, by a wired transmitter), to receive modulated signals (e.g., from one or more antennas 915, from a wired receiver), and to demodulate signals. In some implementations, the transceiver 910 may include one or more interfaces, such as one or more interfaces coupled with the one or more antennas 915 that are configured to support various receiving or obtaining operations, or one or more interfaces coupled with the one or more antennas 915 that are configured to support various transmitting or outputting operations, or a combination thereof. In some implementations, the transceiver 910 may include or be configured for coupling with one or more processors or memory components that are operable to perform or support operations based on received or obtained information or signals, or to generate information or other signals for transmission or other outputting, or any combination thereof. In some implementations, the transceiver 910, or the transceiver 910 and the one or more antennas 915, or the transceiver 910 and the one or more antennas 915 and one or more processors or memory components (for example, the processor 935, or the memory 925, or both), may be included in a chip or chip assembly that is installed in the device 905. In some examples, the transceiver may be operable to support communications via one or more communications links (e.g., a communication link 125, a backhaul communication link 120, a midhaul communication link 162, a fronthaul communication link 168).

The memory 925 may include RAM and ROM. The memory 925 may store computer-readable, computer-executable code 930 including instructions that, when executed by the processor 935, cause the device 905 to perform various functions described herein. The code 930 may be stored in a non-transitory computer-readable medium such as system memory or another type of memory. In some cases, the code 930 may not be directly executable by the processor 935 but may cause a computer (e.g., when compiled and executed) to perform functions described herein. In some cases, the memory 925 may contain, among other things, a BIOS which may control basic hardware or software operation such as the interaction with peripheral components or devices.

The processor 935 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 935 may be configured to operate a memory array using a memory controller. In some other cases, a memory controller may be integrated into the processor 935. The processor 935 may be configured to execute computer-readable instructions stored in a memory (e.g., the memory

925) to cause the device 905 to perform various functions (e.g., functions or tasks supporting TA acquisition in LTM). For example, the device 905 or a component of the device 905 may include a processor 935 and memory 925 coupled with the processor 935, the processor 935 and memory 925 configured to perform various functions described herein. The processor 935 may be an example of a cloud-computing platform (e.g., one or more physical nodes and supporting software such as operating systems, virtual machines, or container instances) that may host the functions (e.g., by executing code 930) to perform the functions of the device 905. The processor 935 may be any one or more suitable processors capable of executing scripts or instructions of one or more software programs stored in the device 905 (such as within the memory 925). In some implementations, the processor 935 may be a component of a processing system. A processing system may generally refer to a system or series of machines or components that receives inputs and processes the inputs to produce a set of outputs (which may be passed to other systems or components of, for example, the device 905). For example, a processing system of the device 905 may refer to a system including the various other components or subcomponents of the device 905, such as the processor 935, or the transceiver 910, or the communications manager 920, or other components or combinations of components of the device 905. The processing system of the device 905 may interface with other components of the device 905, and may process information received from other components (such as inputs or signals) or output information to other components. For example, a chip or modem of the device 905 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 905 may transmit information output from the chip or modem. Additionally, or alternatively, in some implementations, the one or more interfaces may refer to an interface between the processing system of the chip or modem and a receiver, such that the device 905 may obtain information or signal inputs, and the information may be passed to the processing system. A person having ordinary skill in the art will readily recognize that a first interface also may obtain information or signal inputs, and a second interface also may output information or signal outputs.

In some examples, a bus 940 may support communications of (e.g., within) a protocol layer of a protocol stack. In some examples, a bus 940 may support communications associated with a logical channel of a protocol stack (e.g., between protocol layers of a protocol stack), which may include communications performed within a component of the device 905, or between different components of the device 905 that may be co-located or located in different locations (e.g., where the device 905 may refer to a system in which one or more of the communications manager 920, the transceiver 910, the memory 925, the code 930, and the processor 935 may be located in one of the different components or divided between different components).

In some examples, the communications manager 920 may manage aspects of communications with a core network 130 (e.g., via one or more wired or wireless backhaul links). For example, the communications manager 920 may manage the transfer of data communications for client devices, such as one or more UEs 115. In some examples, the communications manager 920 may manage communications with other network entities 105, and may include a controller or scheduler for controlling communications with UEs 115 in cooperation with other network entities 105. In some examples, the communications manager 920 may support an X2 interface within an LTE/LTE-A wireless communications network technology to provide communication between network entities 105.

The communications manager 920 may support wireless communications at a DU (e.g., a DU1) associated with a first cell in accordance with examples as disclosed herein. For example, the communications manager 920 is capable of, configured to, or operable to support a means for transmitting, to a CU associated with the DU, a first indication of a set of RACH preambles for TA information acquisition in association with a triggered cell switch to the first cell. The communications manager 920 is capable of, configured to, or operable to support a means for receiving, from a UE associated with a second cell, a RACH message indicating a RACH preamble of the set of RACH preambles. The communications manager 920 is capable of, configured to, or operable to support a means for transmitting, to the CU, a second indication of TA information associated with the RACH message.

Additionally, or alternatively, the communications manager 920 may support wireless communications at a CU in accordance with examples as disclosed herein. For example, the communications manager 920 is capable of, configured to, or operable to support a means for receiving, from a first DU (e.g., a DU1) associated with the CU, a first indication of a set of RACH preambles for TA information acquisition in association with a triggered cell switch to a first cell associated with the first DU. The communications manager 920 is capable of, configured to, or operable to support a means for transmitting, to a second DU (e.g., a DU2) associated with the CU, a second indication of one or more RACH preambles of the set of RACH preambles allocated to the second DU for the TA information acquisition. The communications manager 920 is capable of, configured to, or operable to support a means for receiving, from the first DU, a third indication of TA information associated with a RACH message indicating a RACH preamble of the one or more RACH preambles. The communications manager 920 is capable of, configured to, or operable to support a means for transmitting, to the second DU, a fourth indication of the TA information.

Additionally, or alternatively, the communications manager 920 may support wireless communications at a second DU (e.g., a DU2) associated with a second cell in accordance with examples as disclosed herein. For example, the communications manager 920 is capable of, configured to, or operable to support a means for receiving, from a CU associated with the second DU, a first indication of a set of RACH preambles for TA information acquisition in association with a triggered cell switch to a first cell associated with a first DU (e.g., a DU1). The communications manager 920 is capable of, configured to, or operable to support a means for transmitting, to a UE associated with the first cell, a second indication to transmit, to the first cell, a RACH message indicating a RACH preamble of the set of RACH preambles. The communications manager 920 is capable of, configured to, or operable to support a means for receiving, from the CU, a third indication of TA information associated with the RACH message. The communications manager 920 is capable of, configured to, or operable to support a means for transmitting, to the UE, a fourth indication of the TA information.

By including or configuring the communications manager 920 in accordance with examples as described herein, the device 905 may support techniques for increased mobility support, increased efficiency of RACH preamble ID allocation, reduced latency associated with mobility, TA acquisition for RACH-less cell switching, more efficient utilization of communication resources, and improved coordination between devices, among other benefits.

In some examples, the communications manager 920 may be configured to perform various operations (e.g., receiving, obtaining, monitoring, outputting, transmitting) using or otherwise in cooperation with the transceiver 910, the one or more antennas 915 (e.g., where applicable), or any combination thereof. Although the communications manager 920 is illustrated as a separate component, in some examples, one or more functions described with reference to the communications manager 920 may be supported by or performed by the transceiver 910, the processor 935, the memory 925, the code 930, or any combination thereof. For example, the code 930 may include instructions executable by the processor 935 to cause the device 905 to perform various aspects of TA acquisition in LTM as described herein, or the processor 935 and the memory 925 may be otherwise configured to perform or support such operations.

Figure 10:
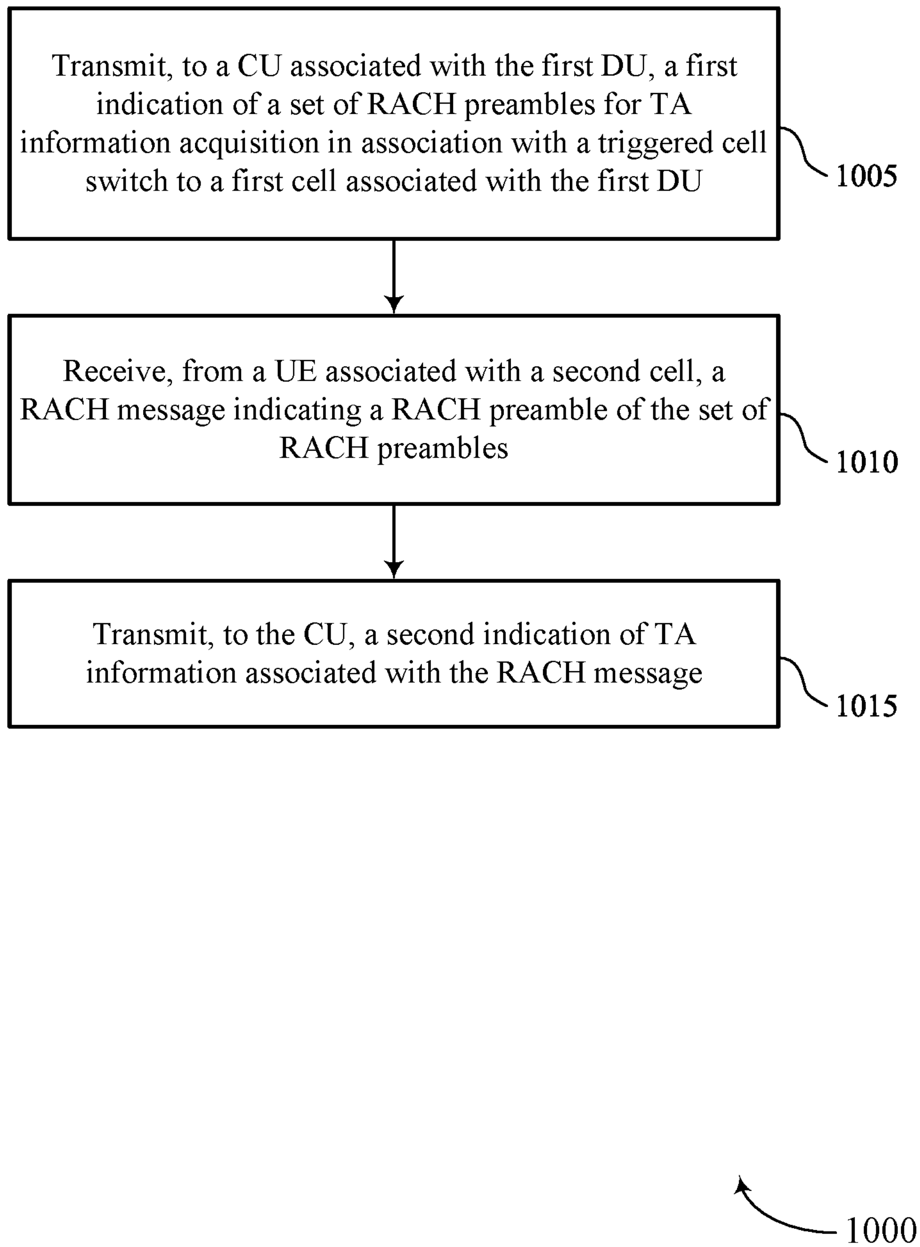
FIGS. 10 through 18 show flowcharts illustrating methods that support TA acquisition in LTM in accordance with one or more aspects of the present disclosure.

FIG. 10 shows a flowchart illustrating a method 1000 that supports TA acquisition in LTM in accordance with aspects of the present disclosure. The operations of the method 1000 may be implemented by a first DU (e.g., a DU1, a network entity) or its components as described herein. For example, the operations of the method 1000 may be performed by a DU as described with reference to FIGS. 1 through 9. In some examples, a DU may execute a set of instructions to control the functional elements of the DU to perform the described functions. Additionally, or alternatively, the DU may perform aspects of the described functions using special-purpose hardware.

At 1005, the method may include transmitting, to a CU associated with the first DU, a first indication of a set of RACH preambles for TA information acquisition in association with a triggered cell switch to the first cell. The operations of 1005 may be performed in accordance with examples as disclosed herein. In some examples, aspects of the operations of 1005 may be performed by a preamble component 825 as described with reference to FIG. 8.

At 1010, the method may include receiving, from a UE associated with a second cell, a RACH message indicating a RACH preamble of the set of RACH preambles. The operations of 1010 may be performed in accordance with examples as disclosed herein. In some examples, aspects of the operations of 1010 may be performed by a RACH message component 830 as described with reference to FIG. 8.

At 1015, the method may include transmitting, to the CU, a second indication of TA information associated with the RACH message. The operations of 1015 may be performed in accordance with examples as disclosed herein. In some examples, aspects of the operations of 1015 may be performed by a TA component 835 as described with reference to FIG. 8.

Figure 11:
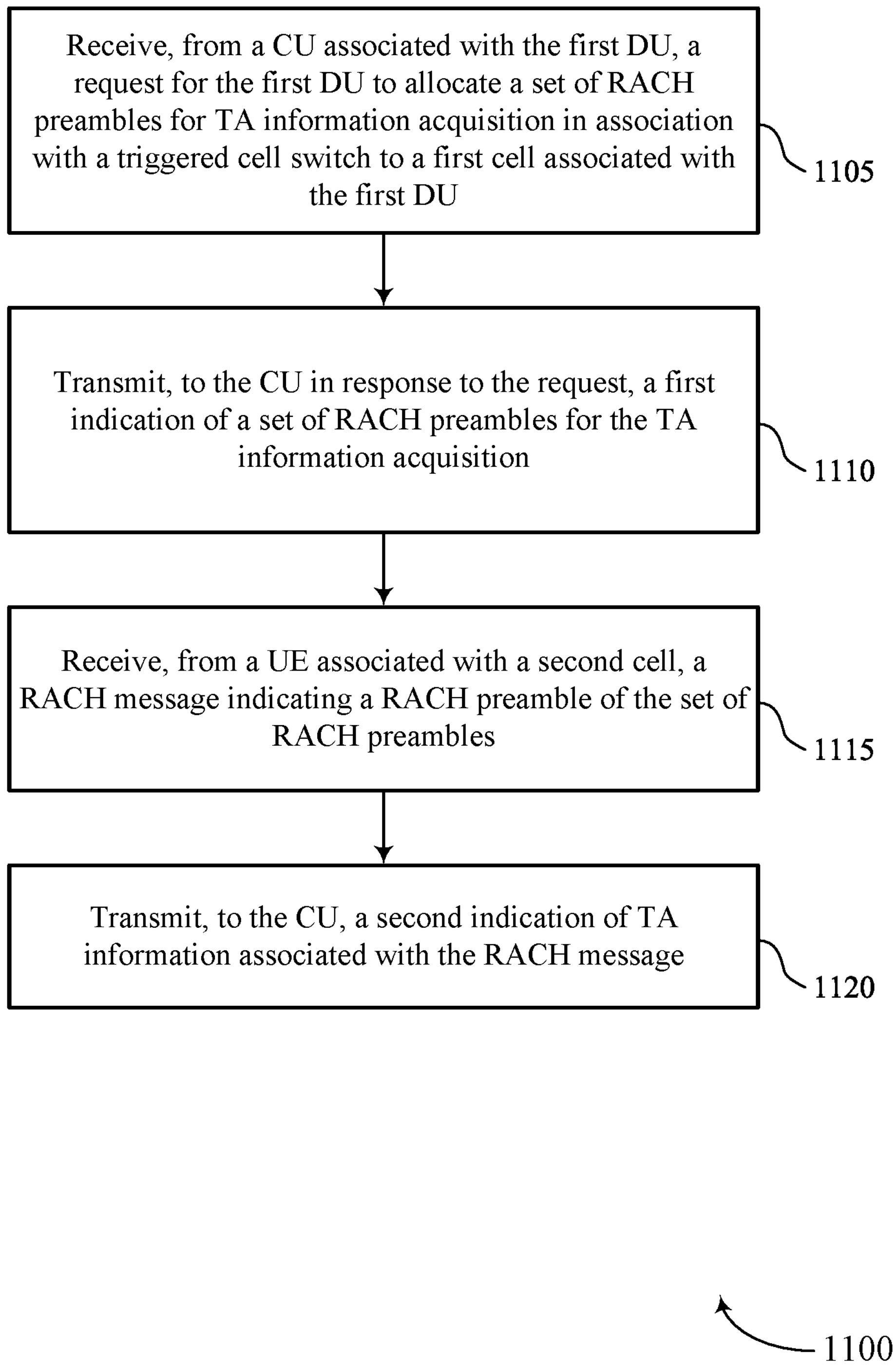

FIG. 11 shows a flowchart illustrating a method 1100 that supports TA acquisition in LTM in accordance with aspects of the present disclosure. The operations of the method 1100 may be implemented by a first DU (e.g., a DU1, a network entity) or its components as described herein. For example, the operations of the method 1100 may be performed by a DU as described with reference to FIGS. 1 through 9. In some examples, a DU may execute a set of instructions to control the functional elements of the DU to perform the described functions. Additionally, or alternatively, the DU may perform aspects of the described functions using special-purpose hardware.

At 1105, the method may include receiving, from a CU associated with the first DU, a request for the first DU to allocate a set of RACH preambles for TA information acquisition in association with a triggered cell switch to a first cell associated with the first DU. The operations of 1105 may be performed in accordance with examples as disclosed herein. In some examples, aspects of the operations of 1105 may be performed by a request component 845 as described with reference to FIG. 8.

At 1110, the method may include transmitting, to the CU in response to the request, a first indication of the set of RACH preambles for the TA information acquisition. The operations of 1110 may be performed in accordance with examples as disclosed herein. In some examples, aspects of the operations of 1110 may be performed by a preamble component 825 as described with reference to FIG. 8.

At 1115, the method may include receiving, from a UE associated with a second cell, a RACH message indicating a RACH preamble of the set of RACH preambles. The operations of 1115 may be performed in accordance with examples as disclosed herein. In some examples, aspects of the operations of 1115 may be performed by a RACH message component 830 as described with reference to FIG. 8.

At 1120, the method may include transmitting, to the CU, a second indication of TA information associated with the RACH message. The operations of 1120 may be performed in accordance with examples as disclosed herein. In some examples, aspects of the operations of 1120 may be performed by a TA component 835 as described with reference to FIG. 8.

Figure 12:
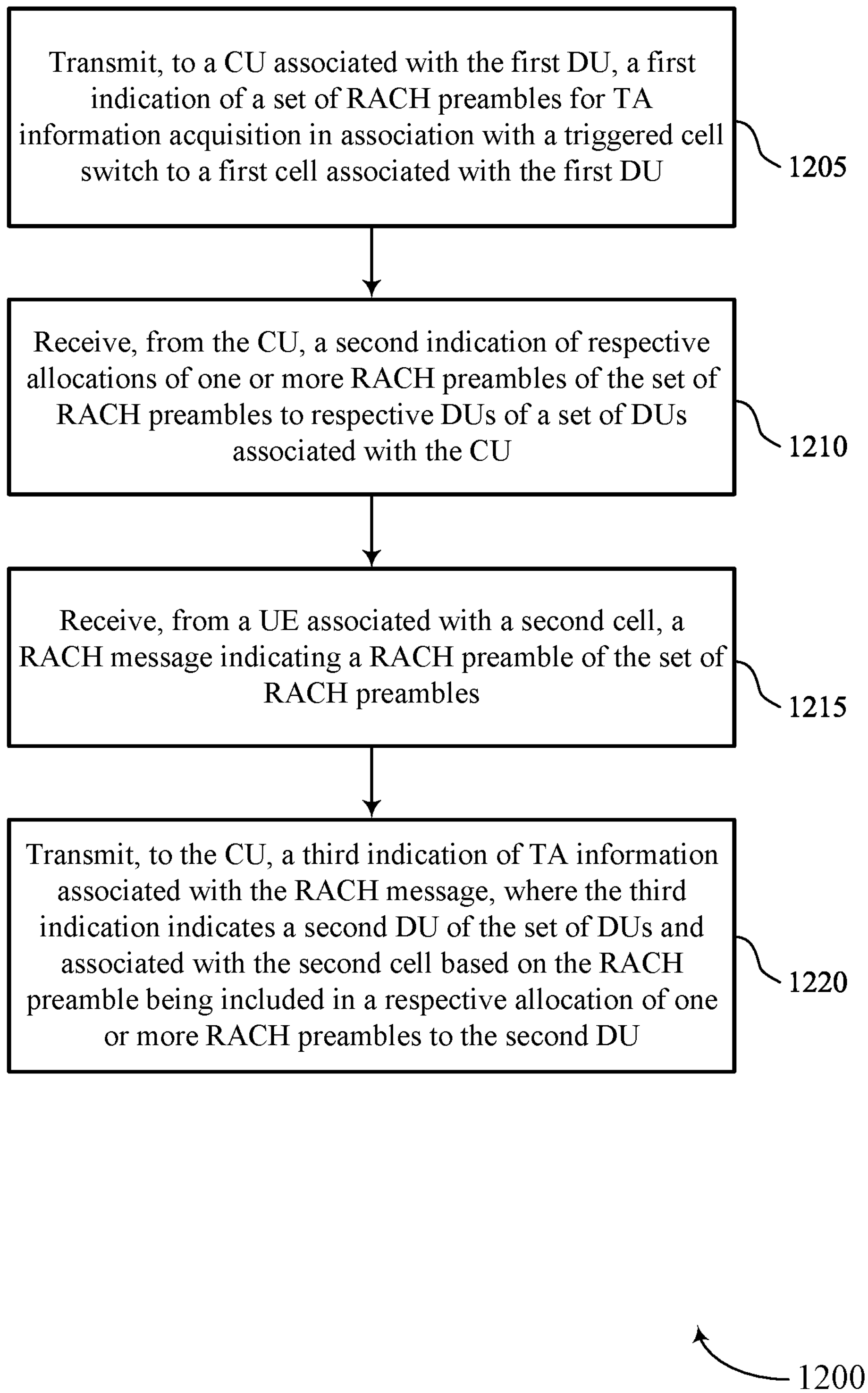

FIG. 12 shows a flowchart illustrating a method 1200 that supports TA acquisition in LTM in accordance with aspects of the present disclosure. The operations of the method 1200 may be implemented by a first DU (e.g., a DU1, a network entity) or its components as described herein. For example, the operations of the method 1200 may be performed by a DU as described with reference to FIGS. 1 through 9. In some examples, a DU may execute a set of instructions to control the functional elements of the DU to perform the described functions. Additionally, or alternatively, the DU may perform aspects of the described functions using special-purpose hardware.

At 1205, the method may include transmitting, to a CU associated with the first DU, a first indication of a set of RACH preambles for TA information acquisition in association with a triggered cell switch to the first cell associated with the first DU. The operations of 1205 may be performed in accordance with examples as disclosed herein. In some examples, aspects of the operations of 1205 may be performed by a preamble component 825 as described with reference to FIG. 8.

At 1210, the method may include receiving, from the CU, a second indication of respective allocations of one or more RACH preambles of the set of RACH preambles to respective DUs of a set of DUs associated with the CU. The operations of 1210 may be performed in accordance with examples as disclosed herein. In some examples, aspects of the operations of 1210 may be performed by a preamble component 825 as described with reference to FIG. 8.

At 1215, the method may include receiving, from a UE associated with a second cell, a RACH message indicating a RACH preamble of the set of RACH preambles. The operations of 1215 may be performed in accordance with examples as disclosed herein. In some examples, aspects of the operations of 1215 may be performed by a RACH message component 830 as described with reference to FIG. 8.

At 1220, the method may include transmitting, to the CU, a third indication of TA information associated with the RACH message, where the third indication indicates a second DU of the set of DUs and associated with the second cell based on the RACH preamble being included in a respective allocation of one or more RACH preambles to the second DU. The operations of 1220 may be performed in accordance with examples as disclosed herein. In some examples, aspects of the operations of 1220 may be performed by a TA component 835 as described with reference to FIG. 8.

Figure 13:
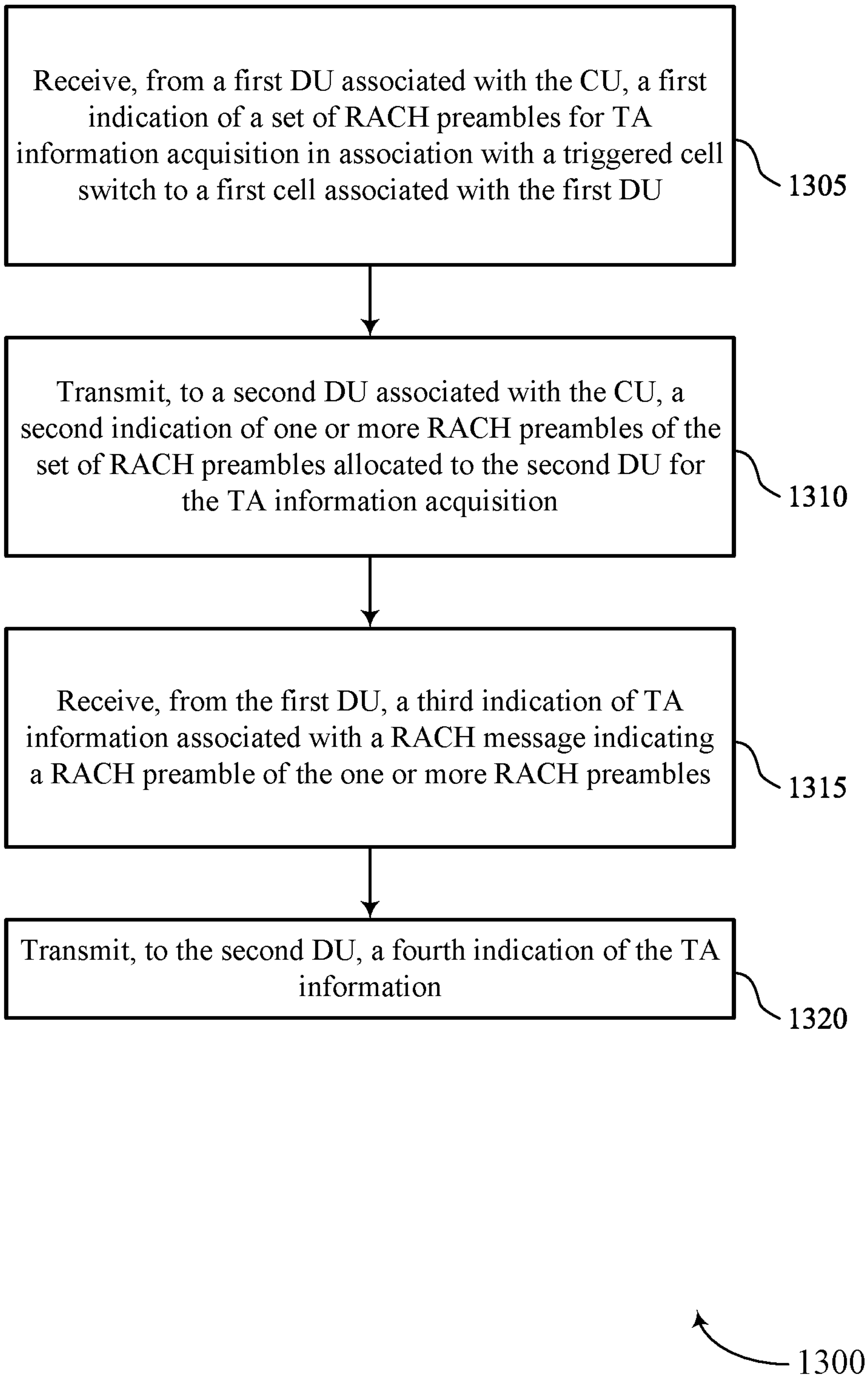

FIG. 13 shows a flowchart illustrating a method 1300 that supports TA acquisition in LTM in accordance with aspects of the present disclosure. The operations of the method 1300 may be implemented by a CU (e.g., a network entity) or its components as described herein. For example, the operations of the method 1300 may be performed by a CU as described with reference to FIGS. 1 through 9. In some examples, a CU may execute a set of instructions to control the functional elements of the CU to perform the described functions. Additionally, or alternatively, the CU may perform aspects of the described functions using special-purpose hardware.

At 1305, the method may include receiving, from a first DU associated with the CU, a first indication of a set of RACH preambles for TA information acquisition in association with a triggered cell switch to a first cell associated with the first DU. The operations of 1305 may be performed in accordance with examples as disclosed herein. In some examples, aspects of the operations of 1305 may be performed by a preamble component 825 as described with reference to FIG. 8.

At 1310, the method may include transmitting, to a second DU associated with the CU, a second indication of one or more RACH preambles of the set of RACH preambles allocated to the second DU for the TA information acquisition. The operations of 1310 may be performed in accordance with examples as disclosed herein. In some examples, aspects of the operations of 1310 may be performed by a preamble component 825 as described with reference to FIG. 8.

At 1315, the method may include receiving, from the first DU, a third indication of TA information associated with a RACH message indicating a RACH preamble of the one or more RACH preambles. The operations of 1315 may be performed in accordance with examples as disclosed herein. In some examples, aspects of the operations of 1315 may be performed by a TA component 835 as described with reference to FIG. 8.

At 1320, the method may include transmitting, to the second DU, a fourth indication of the TA information. The operations of 1320 may be performed in accordance with examples as disclosed herein. In some examples, aspects of the operations of 1320 may be performed by a TA component 835 as described with reference to FIG. 8.

Figure 14:
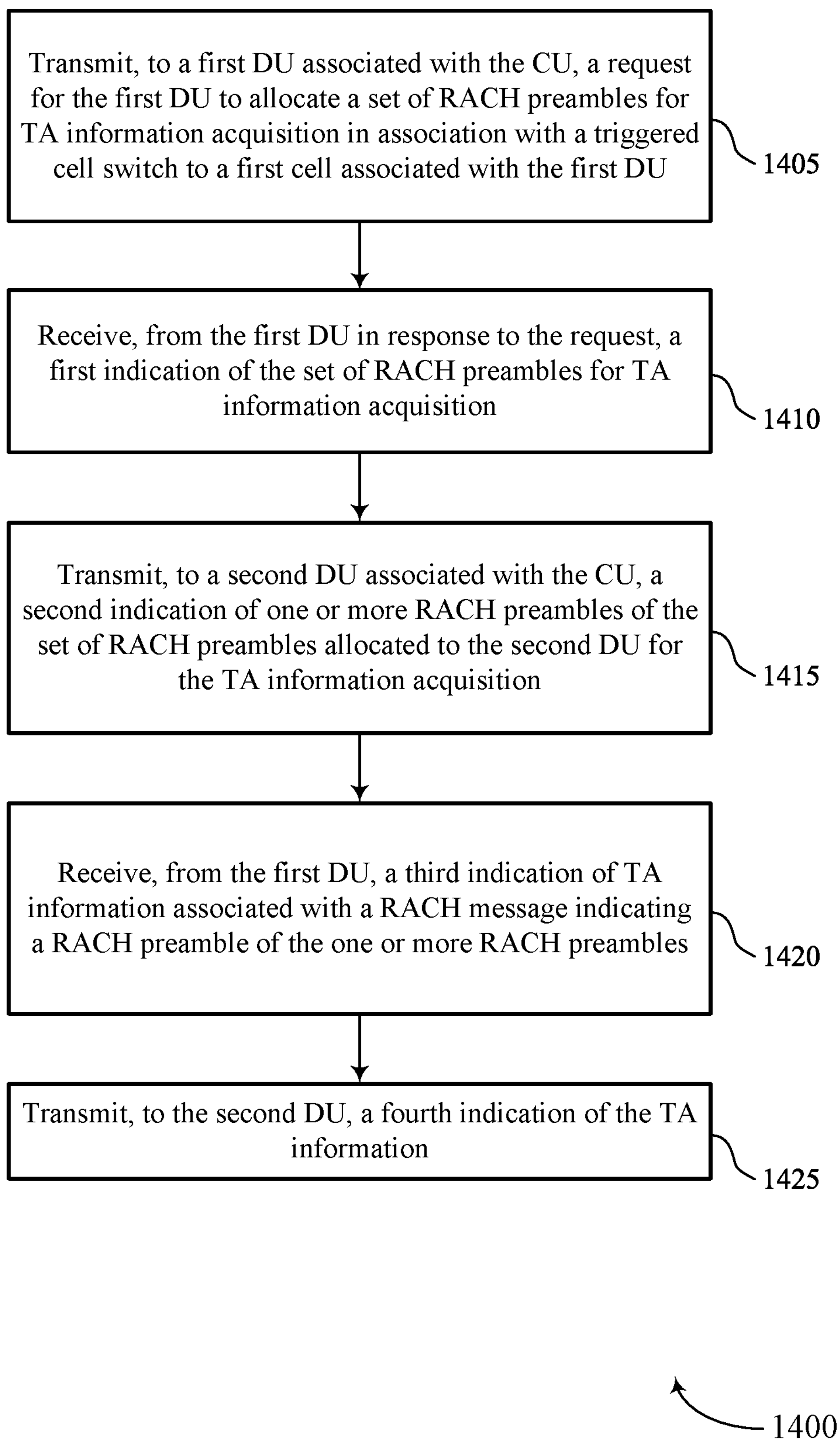

FIG. 14 shows a flowchart illustrating a method 1400 that supports TA acquisition in LTM in accordance with aspects of the present disclosure. The operations of the method 1400 may be implemented by a CU (e.g., network entity) or its components as described herein. For example, the operations of the method 1400 may be performed by a CU as described with reference to FIGS. 1 through 9. In some examples, a CU may execute a set of instructions to control the functional elements of the CU to perform the described functions. Additionally, or alternatively, the CU may perform aspects of the described functions using special-purpose hardware.

At 1405, the method may include transmitting, to a first DU associated with the CU, a request for the first DU to allocate a set of RACH preambles for TA information acquisition in association with a triggered cell switch to a first cell associated with the first DU. The operations of 1405 may be performed in accordance with examples as disclosed herein. In some examples, aspects of the operations of 1405 may be performed by a request component 845 as described with reference to FIG. 8.

At 1410, the method may include receiving, from the first DU in response to the request, a first indication of the set of RACH preambles for TA information acquisition. The operations of 1410 may be performed in accordance with examples as disclosed herein. In some examples, aspects of the operations of 1410 may be performed by a preamble component 825 as described with reference to FIG. 8.

At 1415, the method may include transmitting, to a second DU associated with the CU, a second indication of one or more RACH preambles of the set of RACH preambles allocated to the second DU for the TA information acquisition. The operations of 1415 may be performed in accordance with examples as disclosed herein. In some examples, aspects of the operations of 1415 may be performed by a preamble component 825 as described with reference to FIG. 8.

At 1420, the method may include receiving, from the first DU, a third indication of TA information associated with a RACH message indicating a RACH preamble of the one or more RACH preambles. The operations of 1420 may be performed in accordance with examples as disclosed herein. In some examples, aspects of the operations of 1420 may be performed by a TA component 835 as described with reference to FIG. 8.

At 1425, the method may include transmitting, to the second DU, a fourth indication of the TA information. The operations of 1425 may be performed in accordance with examples as disclosed herein. In some examples, aspects of the operations of 1425 may be performed by a TA component 835 as described with reference to FIG. 8.

Figure 15:
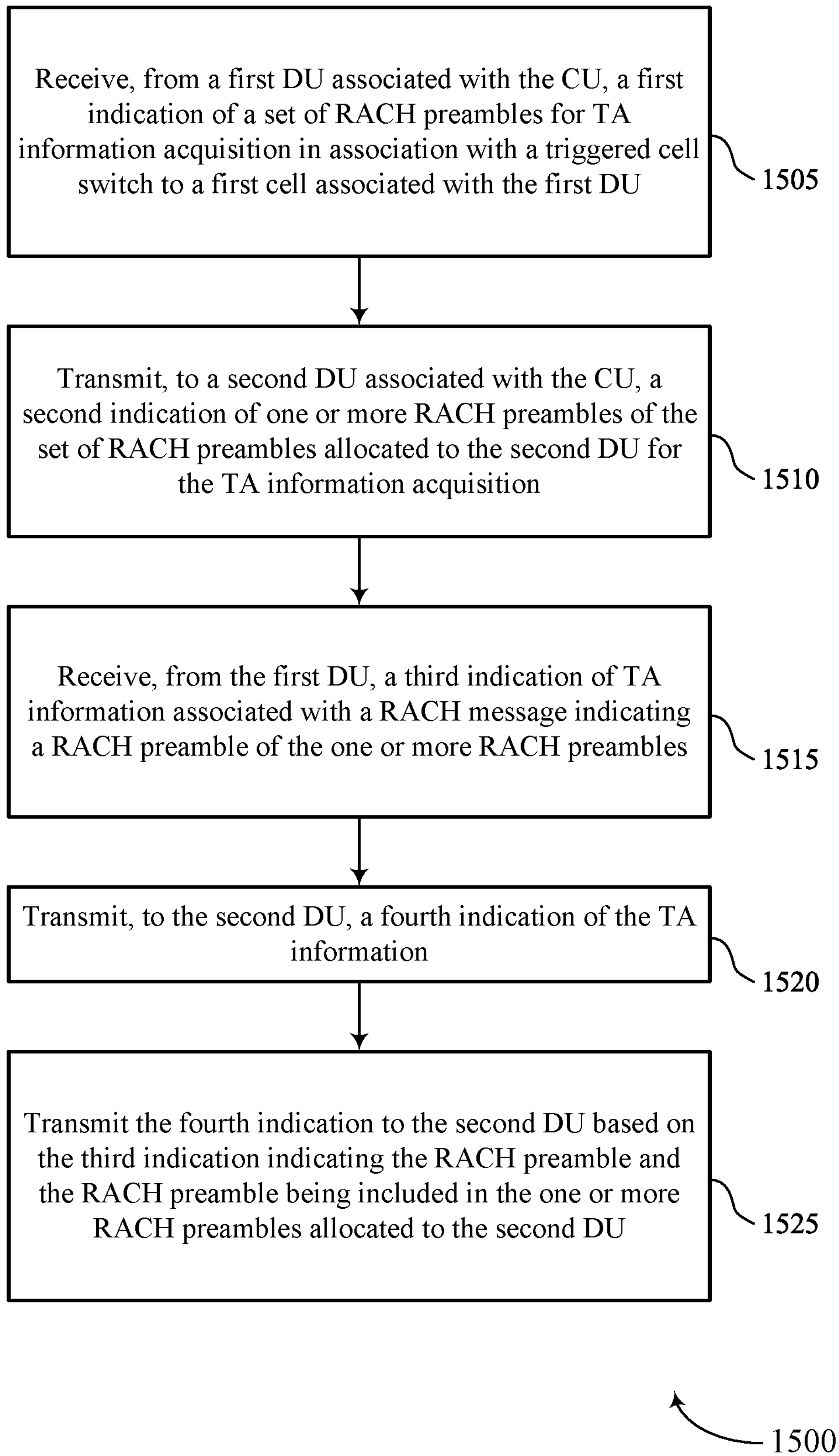

FIG. 15 shows a flowchart illustrating a method 1500 that supports TA acquisition in LTM in accordance with aspects of the present disclosure. The operations of the method 1500 may be implemented by a CU (e.g., a network entity) or its components as described herein. For example, the operations of the method 1500 may be performed by a CU as described with reference to FIGS. 1 through 9. In some examples, a CU may execute a set of instructions to control the functional elements of the CU to perform the described functions. Additionally, or alternatively, the CU may perform aspects of the described functions using special-purpose hardware.

At 1505, the method may include receiving, from a first DU associated with the CU, a first indication of a set of RACH preambles for TA information acquisition in association with a triggered cell switch to a first cell associated with the first DU. The operations of 1505 may be performed in accordance with examples as disclosed herein. In some examples, aspects of the operations of 1505 may be performed by a preamble component 825 as described with reference to FIG. 8.

At 1510, the method may include transmitting, to a second DU associated with the CU, a second indication of one or more RACH preambles of the set of RACH preambles allocated to the second DU for the TA information acquisition. The operations of 1510 may be performed in accordance with examples as disclosed herein. In some examples, aspects of the operations of 1510 may be performed by a preamble component 825 as described with reference to FIG. 8.

At 1515, the method may include receiving, from the first DU, a third indication of TA information associated with a RACH message indicating a RACH preamble of the one or more RACH preambles. The operations of 1515 may be performed in accordance with examples as disclosed herein. In some examples, aspects of the operations of 1515 may be performed by a TA component 835 as described with reference to FIG. 8.

At 1520, the method may include transmitting, to the second DU, a fourth indication of the TA information. The operations of 1520 may be performed in accordance with examples as disclosed herein. In some examples, aspects of the operations of 1520 may be performed by a TA component 835 as described with reference to FIG. 8.

At 1525, to support transmitting the fourth indication, the method may include transmitting the fourth indication to the second DU based on the third indication indicating the RACH preamble and the RACH preamble being included in the one or more RACH preambles allocated to the second DU. The operations of 1525 may be performed in accordance with examples as disclosed herein. In some examples, aspects of the operations of 1525 may be performed by a TA component 835 as described with reference to FIG. 8.

Figure 16:
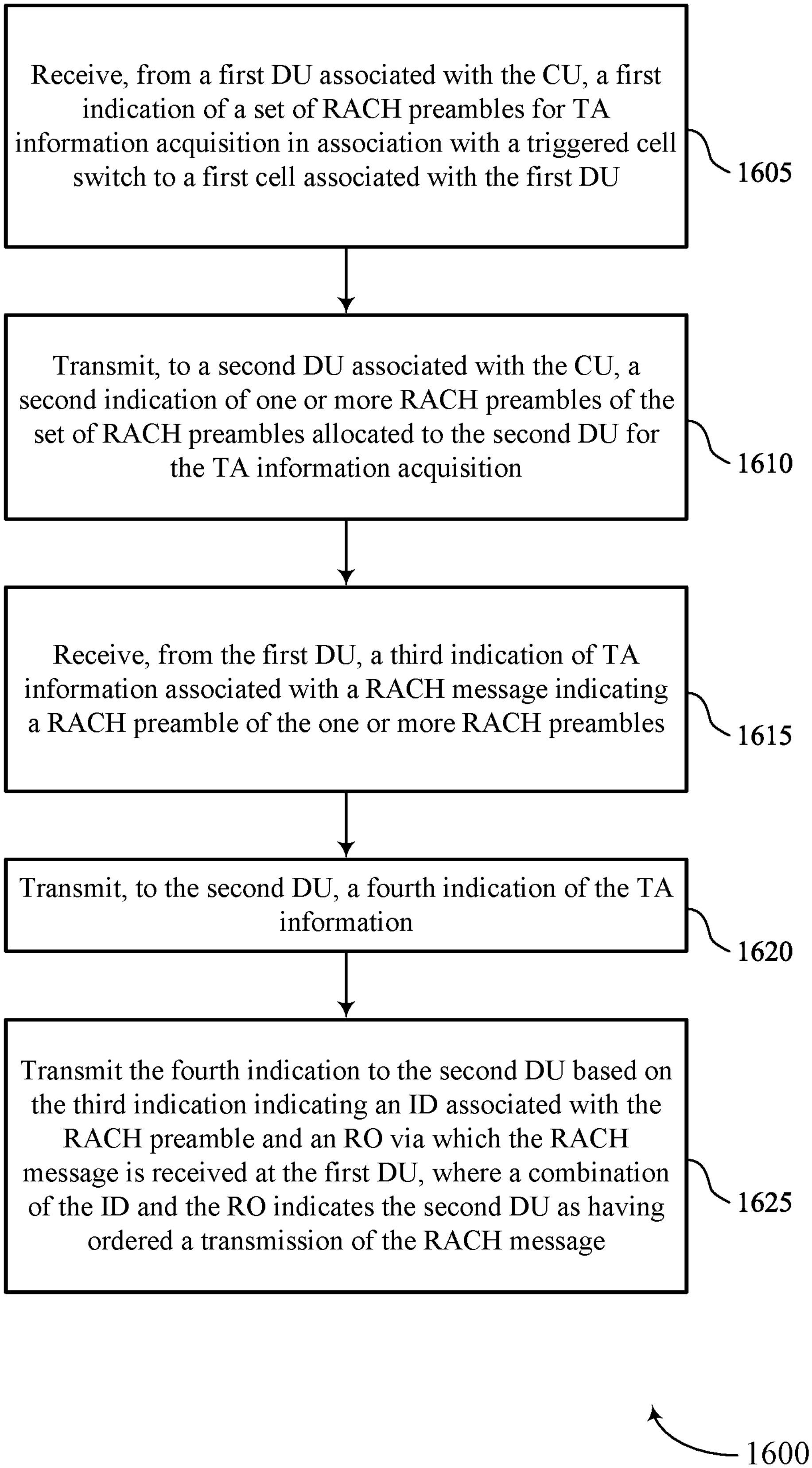

FIG. 16 shows a flowchart illustrating a method 1600 that supports TA acquisition in LTM in accordance with aspects of the present disclosure. The operations of the method 1600 may be implemented by a CU (e.g., a network entity) or its components as described herein. For example, the operations of the method 1600 may be performed by a CU as described with reference to FIGS. 1 through 9. In some examples, a CU may execute a set of instructions to control the functional elements of the CU to perform the described functions. Additionally, or alternatively, the CU may perform aspects of the described functions using special-purpose hardware.

At 1605, the method may include receiving, from a first DU associated with the CU, a first indication of a set of RACH preambles for TA information acquisition in association with a triggered cell switch to a first cell associated with the first DU. The operations of 1605 may be performed in accordance with examples as disclosed herein. In some examples, aspects of the operations of 1605 may be performed by a preamble component 825 as described with reference to FIG. 8.

At 1610, the method may include transmitting, to a second DU associated with the CU, a second indication of one or more RACH preambles of the set of RACH preambles allocated to the second DU for the TA information acquisition. The operations of 1610 may be performed in accordance with examples as disclosed herein. In some examples, aspects of the operations of 1610 may be performed by a preamble component 825 as described with reference to FIG. 8.

At 1615, the method may include receiving, from the first DU, a third indication of TA information associated with a RACH message indicating a RACH preamble of the one or more RACH preambles. The operations of 1615 may be performed in accordance with examples as disclosed herein. In some examples, aspects of the operations of 1615 may be performed by a TA component 835 as described with reference to FIG. 8.

At 1620, the method may include transmitting, to the second DU, a fourth indication of the TA information. The operations of 1620 may be performed in accordance with examples as disclosed herein. In some examples, aspects of the operations of 1620 may be performed by a TA component 835 as described with reference to FIG. 8.

At 1625, to support transmitting the fourth indication, the method may include transmitting the fourth indication to the second DU based on the third indication indicating an ID associated with the RACH preamble and an RO via which the RACH message is received at the first DU, where a combination of the ID and the RO indicates the second DU as having ordered a transmission of the RACH message. The operations of 1625 may be performed in accordance with examples as disclosed herein. In some examples, aspects of the operations of 1625 may be performed by a TA component 835 as described with reference to FIG. 8.

Figure 17:
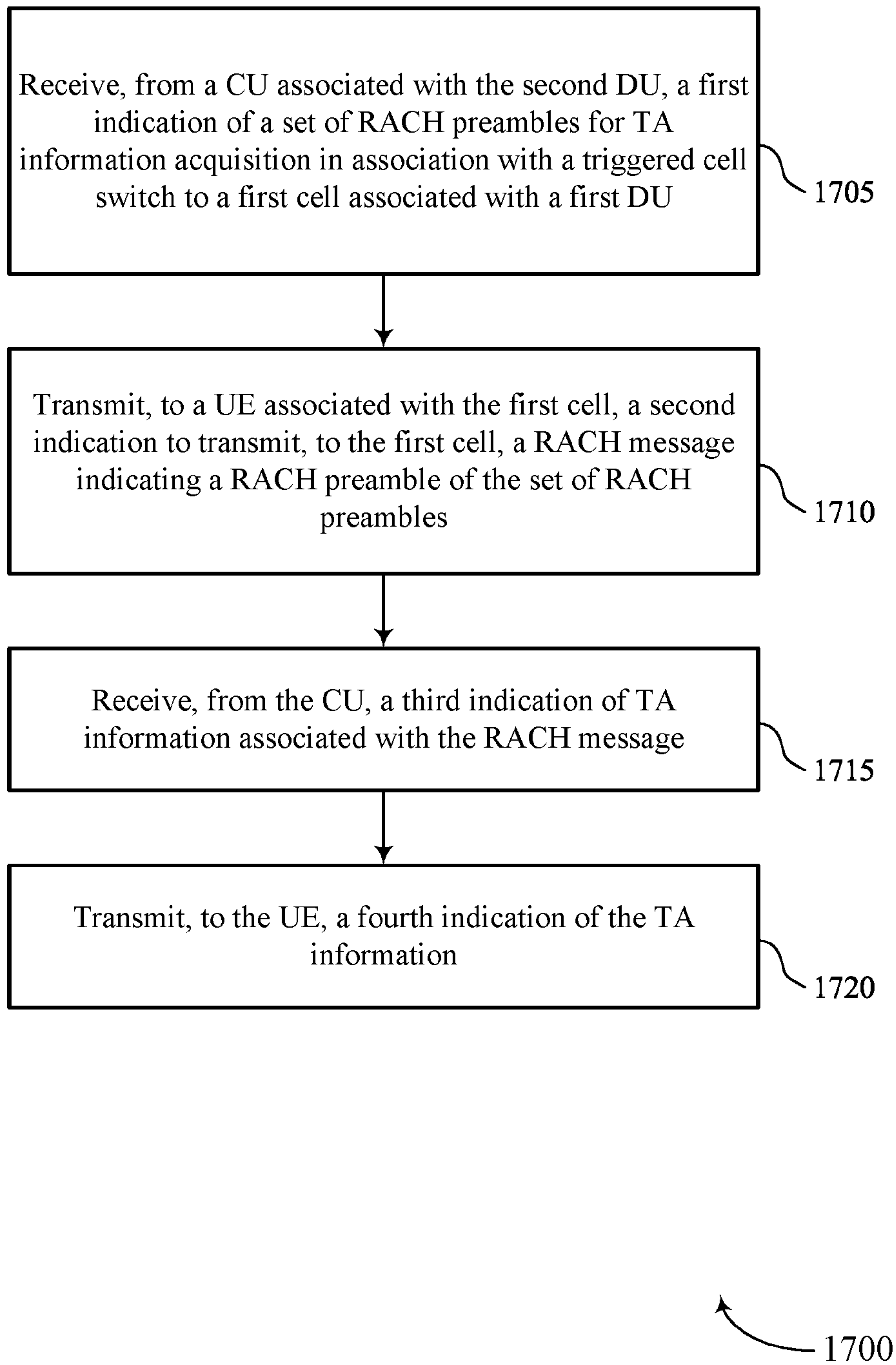

FIG. 17 shows a flowchart illustrating a method 1700 that supports TA acquisition in LTM in accordance with aspects of the present disclosure. The operations of the method 1700 may be implemented by a second DU (e.g., a DU2, a network entity) or its components as described herein. For example, the operations of the method 1700 may be performed by a DU as described with reference to FIGS. 1 through 9. In some examples, a DU may execute a set of instructions to control the functional elements of the DU to perform the described functions. Additionally, or alternatively, the DU may perform aspects of the described functions using special-purpose hardware.

At 1705, the method may include receiving, from a CU associated with the second DU, a first indication of a set of RACH preambles for TA information acquisition in association with a triggered cell switch to a first cell associated with a first DU. The operations of 1705 may be performed in accordance with examples as disclosed herein. In some examples, aspects of the operations of 1705 may be performed by a preamble component 825 as described with reference to FIG. 8.

At 1710, the method may include transmitting, to a UE associated with the first cell, a second indication to transmit, to the first cell, a RACH message indicating a RACH preamble of the set of RACH preambles. The operations of 1710 may be performed in accordance with examples as disclosed herein. In some examples, aspects of the operations of 1710 may be performed by a RACH message component 830 as described with reference to FIG. 8.

At 1715, the method may include receiving, from the CU, a third indication of TA information associated with the RACH message. The operations of 1715 may be performed in accordance with examples as disclosed herein. In some examples, aspects of the operations of 1715 may be performed by a TA component 835 as described with reference to FIG. 8.

At 1720, the method may include transmitting, to the UE, a fourth of the TA information. The operations of 1720 may be performed in accordance with examples as disclosed herein. In some examples, aspects of the operations of 1720 may be performed by a cell switch component 840 as described with reference to FIG. 8.

Figure 18:
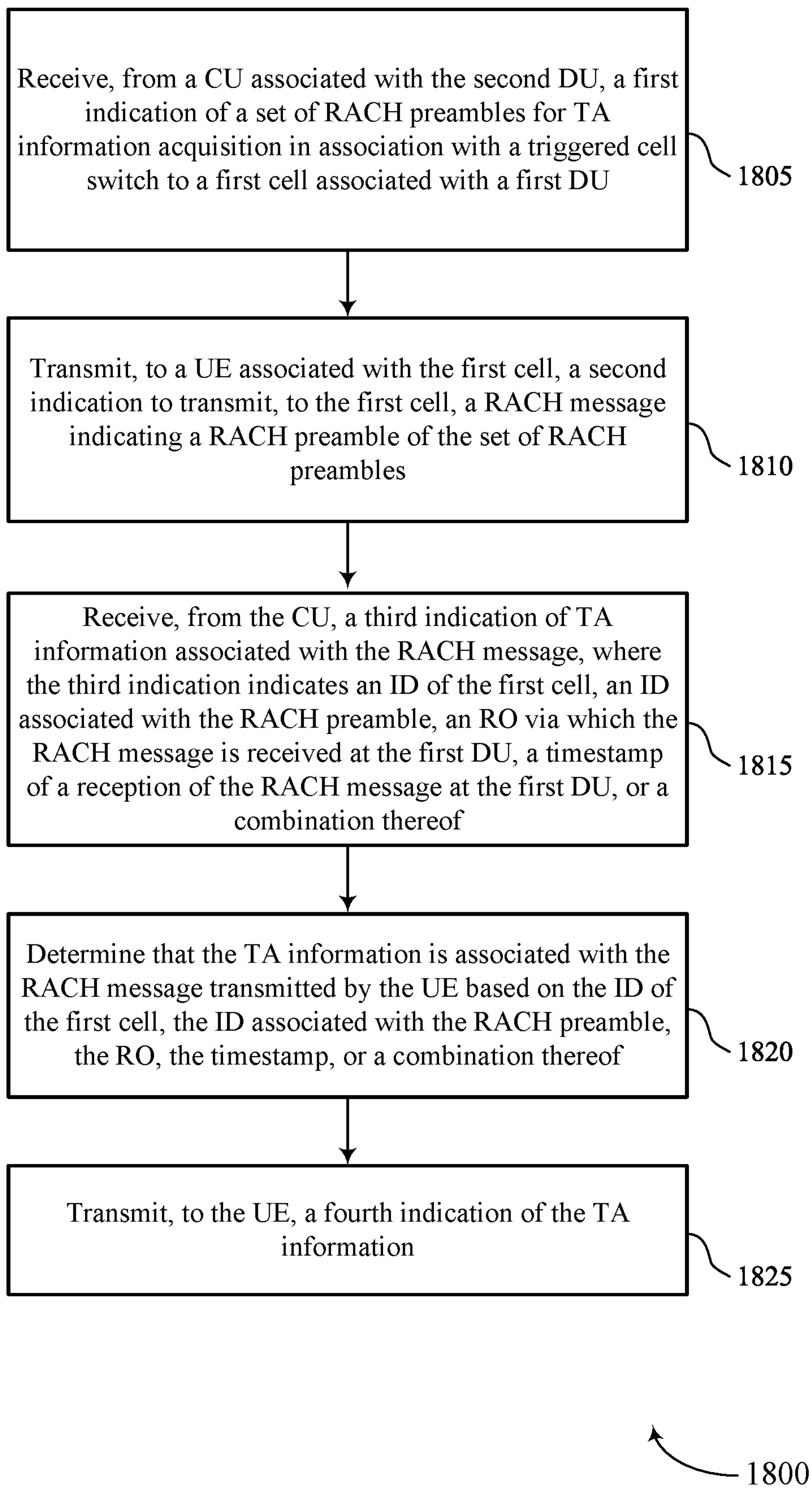

FIG. 18 shows a flowchart illustrating a method 1800 that supports TA acquisition in LTM in accordance with aspects of the present disclosure. The operations of the method 1800 may be implemented by a second DU (e.g., a DU2, a network entity) or its components as described herein. For example, the operations of the method 1800 may be performed by a DU as described with reference to FIGS. 1 through 9. In some examples, a DU may execute a set of instructions to control the functional elements of the DU to perform the described functions. Additionally, or alternatively, the DU may perform aspects of the described functions using special-purpose hardware.

At 1805, the method may include receiving, from a CU associated with the second DU, a first indication of a set of RACH preambles for TA information acquisition in association with a triggered cell switch to a first cell associated with a first DU. The operations of 1805 may be performed in accordance with examples as disclosed herein. In some examples, aspects of the operations of 1805 may be performed by a preamble component 825 as described with reference to FIG. 8.

At 1810, the method may include transmitting, to a UE associated with the first cell, a second indication to transmit, to the first cell, a RACH message indicating a RACH preamble of the set of RACH preambles. The operations of 1810 may be performed in accordance with examples as disclosed herein. In some examples, aspects of the operations of 1810 may be performed by a RACH message component 830 as described with reference to FIG. 8.

At 1815, the method may include receiving, from the CU, a third indication of TA information associated with the RACH message. The operations of 1815 may be performed in accordance with examples as disclosed herein. In some examples, aspects of the operations of 1815 may be performed by a TA component 835 as described with reference to FIG. 8.

At 1820, the method may include determining that the TA information is associated with the RACH message transmitted by the UE based on the ID of the first cell, the ID associated with the RACH preamble, the RO, the timestamp, or a combination thereof. The operations of 1820 may be performed in accordance with examples as disclosed herein. In some examples, aspects of the operations of 1820 may be performed by a TA component 835 as described with reference to FIG. 8.

At 1825, the method may include transmitting, to the UE, a fourth indication of the TA information. The operations of 1825 may be performed in accordance with examples as disclosed herein. In some examples, aspects of the operations of 1825 may be performed by a cell switch component 840 as described with reference to FIG. 8.

The following provides an overview of aspects of the present disclosure:

Aspect 1: A method for wireless communications at a first DU associated with a first cell, comprising: transmitting, to a CU associated with the first DU, a first indication of a set of RACH preambles for TA information acquisition in association with a triggered cell switch to the first cell; receiving, from a UE associated with a second cell, a RACH message indicating a RACH preamble of the set of RACH preambles; and transmitting, to the CU, a second indication of TA information associated with the RACH message.

Aspect 2: The method of aspect 1, further comprising: receiving, from the CU, a request for the first DU to allocate the set of RACH preambles for the TA information acquisition, wherein the request includes an ID of a second DU, and wherein the first indication is transmitted in response to the request.

Aspect 3: The method of any of aspects 1 through 2, wherein the second indication indicates an ID of the first cell, an ID associated with the RACH preamble, the random access channel preamble, a random access channel occasion via which the random access channel message is received, a timestamp of reception of the random access channel message, an indication of the second DU, or a combination thereof.

Aspect 4: The method of any of aspects 1 through 3, wherein the second indication indicates the RACH preamble, an RO via which the RACH message is received, a timestamp of reception of the RACH message, an indication of the second DU, or a combination thereof.

Aspect 5: The method of any of aspects 1 through 4, further comprising: receiving, from the CU, a third indication of respective allocations of one or more RACH preambles of the set of RACH preambles to respective DUs of a set of DUs associated with the CU, wherein the second indication indicates a second DU of the set of DUs and associated with the second cell based at least in part on the RACH preamble being included in a respective allocation of one or more RACH preambles to the second DU.

Aspect 6: The method of any of aspects 1 through 5, further comprising: communicating with the UE based at least in part on a cell switch of the UE to the first cell in accordance with the TA information.

Aspect 7: The method of any of aspects 1 through 6, further comprising: allocating a second set of RACH preambles for the TA information acquisition, the second set of RACH preambles associated with a cell switch from a third cell associated with the DU to the first cell; transmitting, to a second UE associated with the third cell, a third indication to transmit, to the first cell, a second RACH message indicating a second RACH preamble of the second set of RACH preambles; and receiving, from the second UE and based at least in part on the third indication, the second RACH message indicating the second RACH preamble, wherein the second UE is identified by the DU based at least in part on the second RACH preamble.

Aspect 8: The method of aspect 7, wherein the second set of RACH preambles are excluded from the set of RACH preambles based at least in part on being associated with the cell switch from the third cell.

Aspect 9: The method of any of aspects 1 through 8, wherein transmitting the second indication comprises: transmitting the second indication via non-UE associated signaling.

Aspect 10: The method of any of aspects 1 through 9, wherein the triggered cell switch to the first cell is an L1 triggered cell switch or L2 triggered cell switch.

Aspect 11: A method for wireless communications at a CU, comprising: receiving, from a first DU associated with the CU, a first indication of a set of RACH preambles for TA information acquisition in association with a triggered cell switch to a first cell associated with the first DU; transmitting, to a second DU associated with the CU, a second indication of one or more RACH preambles of the set of RACH preambles allocated to the second DU for the TA information acquisition; receiving, from the first DU, a third indication of TA information associated with a RACH message indicating a RACH preamble of the one or more RACH preambles; and transmitting, to the second DU, a fourth indication of the TA information.

Aspect 12: The method of aspect 11, further comprising: transmitting, to the first DU, a request for the first DU to allocate the set of RACH preambles for the TA information acquisition, wherein the request includes an ID of the second DU, and wherein the first indication is received in response to the request.

Aspect 13: The method of any of aspects 11 through 12, wherein transmitting the fourth indication comprises: transmitting the fourth indication to the second DU based at least in part on the third indication indicating the RACH preamble and the RACH preamble being included in the one or more RACH preambles allocated to the second DU.

Aspect 14: The method of any of aspects 11 through 13, further comprising: transmitting, to the first DU, a fifth indication of the allocation of the one or more RACH preambles to the second DU, wherein the third indication indicates the second DU based at least in part on the fifth indication and the RACH preamble being included in the one or more RACH preambles allocated to the second DU.

Aspect 15: The method of aspect 14, wherein transmitting the fourth indication comprises: transmitting the fourth indication to the second DU based at least in part on the third indication indicating the second DU.

Aspect 16: The method of any of aspects 11 through 15, wherein the third indication indicates an ID of the first cell, an ID associated with the RACH preamble, an RO via which the RACH message is received at the first DU, a timestamp of a reception of the RACH message at the first DU, or a combination thereof, and the fourth indication indicates the ID of the first cell, the ID associated with the RACH preamble, the RO, the timestamp of the reception of the RACH message at the first DU, or a combination thereof.

Aspect 17: The method of any of aspects 11 through 16, wherein transmitting the fourth indication comprises: transmitting the fourth indication to the second DU based at least in part on the third indication indicating an ID associated with the RACH preamble and an RO via which the RACH message is received at the first DU, wherein a combination of the ID and the RO indicates the second DU as having ordered a transmission of the RACH message.

Aspect 18: The method of aspect 17, wherein the second indication indicates one or more ROs comprising the RO that are allocated to the second DU, and the combination of the ID and the RO indicates the second DU based at least in part on each of the RACH preamble and the RO being allocated to the second DU.

Aspect 19: The method of any of aspects 11 through 16, wherein transmitting the second indication comprises: transmitting the second indication to a set of DUs comprising the second DU, the second indication indicating an allocation of the one or more RACH preambles to each DU of the set of DUs, wherein the fourth indication is transmitted to the set of DUs based at least in part on the one or more RACH preambles being allocated to each DU of the set of DUs.

Aspect 20: The method of any of aspects 11 through 19, further comprising: receiving, from the second DU, a request to be allocated RACH preambles for the TA information acquisition, wherein the second indication is transmitted in response to the request.

Aspect 21: The method of any of aspects 11 through 20, wherein transmitting the fourth indication comprises: transmitting the fourth indication via non-UE associated signaling.

Aspect 22: The method of any of aspects 11 through 21, wherein receiving the third indication comprises: receiving the third indication via non-UE associated signaling.

Aspect 23: The method of any of aspects 11 through 22, wherein the triggered cell switch to the first cell is an L1 triggered cell switch or L2 triggered cell switch.

Aspect 24: The method of any of aspects 11 through 23, wherein the one or more RACH preambles are allocated to a second cell associated with the second DU or to a group of cells comprising the second cell.

Aspect 25: A method for wireless communications at a second DU associated with a second cell, comprising: receiving, from a CU associated with the second DU, a first indication of a set of RACH preambles for TA information acquisition in association with a triggered cell switch to a first cell associated with a first DU; transmitting, to a UE associated with the first cell, a second indication to transmit, to the first cell, a RACH message indicating a RACH preamble of the set of RACH preambles; receiving, from the CU, a third indication of TA information associated with the RACH message; and transmitting, to the UE, a fourth indication of the TA information.

Aspect 26: The method of aspect 25, wherein transmitting the fourth indication comprises: transmitting the fourth indication via a random access response or via a cell switch indication for the UE to switch to the second cell.

Aspect 27: The method of any of aspects 25 through 26, further comprising: transmitting, to the CU, a request to be allocated the set of RACH preambles for the TA information acquisition, wherein the first indication is received in response to the request.

Aspect 28: The method of any of aspects 25 through 27, further comprising: determining that the TA information is associated with the RACH message transmitted by the UE based at least in part on transmission of the second indication.

Aspect 29: The method of any of aspects 25 through 28, wherein the third indication indicates an ID of the first cell, an ID associated with the RACH preamble, an RO via which the RACH message is received at the first DU, a timestamp of a reception of the RACH message at the first DU, or a combination thereof.

Aspect 30: The method of aspect 29, further comprising: determining that the TA information is associated with the RACH message transmitted by the UE based at least in part on the ID of the first cell, the ID associated with the RACH preamble, the RO, the timestamp, or a combination thereof.

Aspect 31: The method of any of aspects 25 through 30, wherein the first indication indicates one or more ROs that are allocated to the second DU, and the second indication indicates an RO of the one or more ROs for the UE to use to transmit the RACH message.

Aspect 32: The method of aspect 31, further comprising: receiving, from the CU, a fifth indication of second TA information associated with a second RACH message, a second RACH preamble of the set of RACH preambles and associated with the second RACH message, and a second RO via which the second RACH message is communicated; and ignoring the second TA information based at least in part on the second RO being excluded from the one or more ROs allocated to the second DU.

Aspect 33: The method of any of aspects 25 through 32, wherein receiving the third indication comprises: receiving the third indication via non-UE associated signaling.

Aspect 34: The method of any of aspects 25 through 33, wherein the triggered cell switch to the first cell is an L1 triggered cell switch or L2 triggered cell switch.

Aspect 35: The method of any of aspects 25 through 34, wherein the set of RACH preambles are allocated to the second cell associated with the second DU or to a group of cells comprising the second cell.

Aspect 36: An apparatus for wireless communications at a DU associated with a first cell, comprising a processor;

memory coupled with the processor; and instructions stored in the memory and executable by the processor to cause the apparatus to perform a method of any of aspects 1 through 10.

Aspect 37: An apparatus for wireless communications at a DU associated with a first cell, comprising at least one means for performing a method of any of aspects 1 through 10.

Aspect 38: A non-transitory computer-readable medium storing code for wireless communications at a DU associated with a first cell, the code comprising instructions executable by a processor to perform a method of any of aspects 1 through 10.

Aspect 39: An apparatus for wireless communications at a CU, comprising a processor; memory coupled with the processor; and instructions stored in the memory and executable by the processor to cause the apparatus to perform a method of any of aspects 11 through 24.

Aspect 40: An apparatus for wireless communications at a CU, comprising at least one means for performing a method of any of aspects 11 through 24.

Aspect 41: A non-transitory computer-readable medium storing code for wireless communications at a CU, the code comprising instructions executable by a processor to perform a method of any of aspects 11 through 24.

Aspect 42: An apparatus for wireless communications at a second DU associated with a second cell, comprising a processor; memory coupled with the processor; and instructions stored in the memory and executable by the processor to cause the apparatus to perform a method of any of aspects 25 through 35.

Aspect 43: An apparatus for wireless communications at a second DU associated with a second cell, comprising at least one means for performing a method of any of aspects 25 through 35.

Aspect 44: A non-transitory computer-readable medium storing code for wireless communications at a second DU associated with a second cell, the code comprising instructions executable by a processor to perform a method of any of aspects 25 through 35.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first distributed unit for wireless communications, the first distributed unit associated with a first cell and comprising:

- one or more memories storing processor-executable code; and
- one or more processors coupled with the one or more memories and individually or collectively operable to execute the code to cause the first distributed unit to:
  - transmit, to a central unit associated with the first distributed unit, a first indication of a set of random access channel preambles for timing advance information acquisition in association with a triggered cell switch to the first cell;
  - receive, from a user equipment (UE) associated with a second cell, a random access channel message indicating a random access channel preamble of the set of random access channel preambles; and
  - transmit, to the central unit, a second indication of timing advance information associated with the random access channel message.

2. The first distributed unit of claim 1, wherein the one or more processors are individually or collectively further operable to execute the code to cause the first distributed unit to:

- receive, from the central unit, a request for the first distributed unit to allocate the set of random access channel preambles for the timing advance information acquisition, wherein the request includes an identifier of a second distributed unit, and wherein the first indication is transmitted in response to the request.

3. The first distributed unit of claim 1, wherein the second indication indicates an identifier of the first cell, an identifier associated with the random access channel preamble, the random access channel preamble, a random access channel occasion via which the random access channel message is received, a timestamp of reception of the random access channel message, an indication of a second distributed unit, or a combination thereof.

4. The first distributed unit of claim 1, wherein the one or more processors are individually or collectively further operable to execute the code to cause the first distributed unit to:

- receive, from the central unit, a third indication of respective allocations of one or more random access channel preambles of the set of random access channel preambles to respective distributed units of a set of distributed units associated with the central unit, wherein the second indication indicates a second distributed unit of the set of distributed units and associated with the second cell based at least in part on the random access channel preamble being included in a respective allocation of one or more random access channel preambles to the second distributed unit.

5. The first distributed unit of claim 1, wherein, to transmit the second indication, the one or more processors are individually or collectively operable to execute the code to cause the first distributed unit to:

- transmit the second indication via non-UE associated signaling.

6. The first distributed unit of claim 1, wherein the triggered cell switch to the first cell is a layer 1 triggered cell switch or layer 2 triggered cell switch.

7. A central unit for wireless communications, comprising:

- one or more memories storing processor-executable code; and
- one or more processors coupled with the one or more memories and individually or collectively operable to execute the code to cause the central unit to:
  - receive, from a first distributed unit associated with the central unit, a first indication of a set of random access channel preambles for timing advance information acquisition in association with a triggered cell switch to a first cell associated with the first distributed unit;
  - transmit, to a second distributed unit associated with the central unit, a second indication of one or more random access channel preambles of the set of random access channel preambles allocated to the second distributed unit for the timing advance information acquisition;
  - receive, from the first distributed unit, a third indication of timing advance information associated with a random access channel message indicating a random access channel preamble of the one or more random access channel preambles; and transmit, to the second distributed unit, a fourth indication of the timing advance information.

8. The central unit of claim 7, wherein the one or more processors are individually or collectively further operable to execute the code to cause the central unit to:

transmit, to the first distributed unit, a request for the first distributed unit to allocate the set of random access channel preambles for the timing advance information acquisition, wherein the request includes an identifier of the second distributed unit, and wherein the first indication is received in response to the request.

9. The central unit of claim 7, wherein, to transmit the fourth indication, the one or more processors are individually or collectively operable to execute the code to cause the central unit to:

transmit the fourth indication to the second distributed unit based at least in part on the third indication indicating the random access channel preamble and the random access channel preamble being included in the one or more random access channel preambles allocated to the second distributed unit.

10. The central unit of claim 7, wherein the one or more processors are individually or collectively further operable to execute the code to cause the central unit to:

transmit, to the first distributed unit, a fifth indication of the allocation of the one or more random access channel preambles to the second distributed unit, wherein the third indication indicates the second distributed unit based at least in part on the fifth indication and the random access channel preamble being included in the one or more random access channel preambles allocated to the second distributed unit, and wherein the fourth indication is transmitted to the second distributed unit based at least in part on the third indication indicating the second distributed unit.

11. The central unit of claim 7, wherein:

the third indication indicates an identifier of the first cell, an identifier associated with the random access channel preamble, a random access channel occasion via which the random access channel message is received at the first distributed unit, a timestamp of a reception of the random access channel message at the first distributed unit, or a combination thereof, and the fourth indication indicates the identifier of the first cell, the identifier associated with the random access channel preamble, the random access channel occasion, the timestamp of the reception of the random access channel message at the first distributed unit, or a combination thereof.

12. The central unit of claim 7, wherein, to transmit the fourth indication, the one or more processors are individually or collectively operable to execute the code to cause the central unit to:

transmit the fourth indication to the second distributed unit based at least in part on the third indication indicating an identifier associated with the random access channel preamble and a random access channel occasion via which the random access channel message is received at the first distributed unit, wherein a combination of the identifier and the random access channel occasion indicates the second distributed unit as having ordered a transmission of the random access channel message.

13. The central unit of claim 7, wherein, to transmit the second indication, the one or more processors are individually or collectively operable to execute the code to cause the central unit to:

transmit the second indication to a set of distributed units comprising the second distributed unit, the second indication indicating an allocation of the one or more random access channel preambles to each distributed unit of the set of distributed units, wherein the fourth indication is transmitted to the set of distributed units based at least in part on the one or more random access channel preambles being allocated to each distributed unit of the set of distributed units.

14. The central unit of claim 7, wherein, to receive the third indication, the one or more processors are individually or collectively operable to execute the code to cause the central unit to:

receive the third indication via non-UE associated signaling.

15. A second distributed unit for wireless communications, the second distributed unit associated with a second cell and comprising:

one or more memories storing processor-executable code; and one or more processors coupled with the one or more memories and individually or collectively operable to execute the code to cause the second distributed unit to:

receive, from a central unit associated with the second distributed unit, a first indication of a set of random access channel preambles for timing advance information acquisition in association with a triggered cell switch to a first cell associated with a first distributed unit;

transmit, to a user equipment (UE) associated with the first cell, a second indication to transmit, to the first cell, a random access channel message indicating a random access channel preamble of the set of random access channel preambles;

receive from the central unit, a third indication of timing advance information associated with the random access channel message; and transmit, to the UE, a fourth indication of the timing advance information.

16. The second distributed unit of claim 15, wherein the one or more memories and individually or collectively operable to execute the code to cause the second distributed unit to:

transmit the fourth indication via a random access response or via a cell switch indication for the UE to switch to the second cell.

17. The second distributed unit of claim 15, wherein the one or more memories and individually or collectively operable to execute the code to cause the second distributed unit to:

transmit, to the central unit, a request to be allocated the set of random access channel preambles for the timing advance information acquisition, wherein the first indication is received in response to the request.

18. The second distributed unit of claim 15, wherein the one or more memories and individually or collectively operable to execute the code to cause the second distributed unit to:

determine that the timing advance information is associated with the random access channel message transmitted by the UE based at least in part on transmission of the second indication.

19. The second distributed unit of claim 15, wherein the third indication indicates an identifier of the first cell, an identifier associated with the random access channel preamble, a random access channel occasion via which the random access channel message is received at the first distributed unit, a timestamp of a reception of the random access channel message at the first distributed unit, or a combination thereof.

20. The second distributed unit of claim 19, wherein the one or more memories and individually or collectively operable to execute the code to cause the second distributed unit to:

determine that the timing advance information is associated with the random access channel message transmitted by the UE based at least in part on the identifier of the first cell, the identifier associated with the random access channel preamble, the random access channel occasion, the timestamp, or a combination thereof.

* * * * *